(12) United States Patent
Gullicksen

(10) Patent No.: US 11,635,868 B2
(45) Date of Patent: Apr. 25, 2023

(54) MANAGING VIRTUAL CONTENT DISPLAYED TO A USER BASED ON MAPPED USER LOCATION

(71) Applicant: Reavire, Inc., Campbell, CA (US)

(72) Inventor: Jeff Gullicksen, Mountain View, CA (US)

(73) Assignee: Reavire, Inc., Mountain View, CA (US)

(*) Notice: Subject to any disclaimer, the term of this patent is extended or adjusted under 35 U.S.C. 154(b) by 0 days.

(21) Appl. No.: 16/707,373

(22) Filed: Dec. 9, 2019

(65) Prior Publication Data

US 2020/0183567 A1 Jun. 11, 2020
US 2022/0317856 A9 Oct. 6, 2022

Related U.S. Application Data

(63) Continuation of application No. 15/656,500, filed on Jul. 21, 2017, now Pat. No. 10,503,351.
(Continued)

(51) Int. Cl.
*G06F 3/04815* (2022.01)
*G06F 3/01* (2006.01)
*G06F 3/0346* (2013.01)
*G06T 19/00* (2011.01)
*H04L 67/131* (2022.01)
(Continued)

(52) U.S. Cl.
CPC .......... *G06F 3/04815* (2013.01); *G06F 3/011* (2013.01); *G06F 3/017* (2013.01); *G06F 3/0346* (2013.01); *G06F 3/0383* (2013.01); *G06F 3/0482* (2013.01); *G06F 3/04845* (2013.01); *G06T 17/10* (2013.01); *G06T 19/003* (2013.01); *G06F 2203/0384* (2013.01); *G06T 19/006* (2013.01); *H04L 67/131* (2022.05)

(58) Field of Classification Search
None
See application file for complete search history.

(56) References Cited

U.S. PATENT DOCUMENTS 5,917,449 A 6/1999 Sanderford et al.
5,964,701 A 10/1999 Asada et al.
(Continued)

FOREIGN PATENT DOCUMENTS

CN 104902564 9/2015
KR 1020160000873 1/2016
(Continued)

OTHER PUBLICATIONS

"Best room-scale games for the HTC Vive", Jul. 25, 2017, 9 pages, https://www.vrheads.com/best-room-scale-games-htc-vive.
(Continued)

*Primary Examiner* — Anh-Tuan V Nguyen
(74) *Attorney, Agent, or Firm* — BainwoodHuang

(57) ABSTRACT

A technique for rendering virtual content to a user stores map data of features in a physical environment of the user and measures the location of the user with stationary sensors placed at respective locations within the environment. A server provides the location of the user and portions of the map data to a headset worn by the user. The headset is thus enabled to render virtual content at apparent locations that are based on the measured location of the user and the features described by the map data.

25 Claims, 11 Drawing Sheets

Related U.S. Application Data

(60) Provisional application No. 62/491,048, filed on Apr. 27, 2017, provisional application No. 62/397,226, filed on Sep. 20, 2016, provisional application No. 62/378,498, filed on Aug. 23, 2016, provisional application No. 62/378,486, filed on Aug. 23, 2016, provisional application No. 62/378,494, filed on Aug. 23, 2016.

(51) Int. Cl.
*G06F 3/038* (2013.01)
*G06F 3/0482* (2013.01)
*G06F 3/04845* (2022.01)
*G06T 17/10* (2006.01)

(56) References Cited

U.S. PATENT DOCUMENTS

| | | | |
|---|---|---|---|
| 5,999,208 A | 12/1999 | McNerney et al. | |
| 6,249,680 B1 | 6/2001 | Wax et al. | |
| 8,150,384 B2 | 4/2012 | Abifaker et al. | |
| 9,001,120 B2 | 4/2015 | Steedly et al. | |
| 9,001,129 B2 | 4/2015 | Rhee et al. | |
| 9,041,622 B2 | 5/2015 | McCulloch et al. | |
| 9,084,217 B2 | 7/2015 | Wax et al. | |
| 9,288,632 B2 | 3/2016 | Yang et al. | |
| 9,516,503 B2 | 12/2016 | Berns et al. | |
| 9,843,772 B2 | 12/2017 | Lee et al. | |
| 10,048,761 B2 | 8/2018 | Forutanpour et al. | |
| 10,115,149 B1* | 10/2018 | Deem | G06T 19/006 |
| 10,165,949 B2 | 1/2019 | Tzvieli et al. | |
| 2002/0060648 A1 | 5/2002 | Matsui et al. | |
| 2004/0080412 A1 | 4/2004 | Smith et al. | |
| 2005/0093887 A1 | 5/2005 | Shouji | |
| 2006/0143292 A1 | 6/2006 | Taubenheim et al. | |
| 2008/0235320 A1* | 9/2008 | Joy | G06T 19/00 |
| | | | 709/201 |
| 2009/0217211 A1* | 8/2009 | Hildreth | G06F 3/0304 |
| | | | 715/863 |
| 2010/0070859 A1* | 3/2010 | Shuster | A63F 13/20 |
| | | | 715/706 |
| 2010/0093438 A1* | 4/2010 | Baszucki | A63F 13/12 |
| | | | 463/42 |
| 2011/0009241 A1* | 1/2011 | Lane | A63B 24/0087 |
| | | | 482/8 |
| 2011/0246908 A1 | 10/2011 | Akram et al. | |
| 2012/0050257 A1* | 3/2012 | Clarke | G06F 16/972 |
| | | | 707/769 |
| 2013/0117377 A1* | 5/2013 | Miller | A63F 13/35 |
| | | | 709/205 |
| 2013/0141419 A1 | 6/2013 | Mount et al. | |
| 2013/0196772 A1 | 8/2013 | Latta et al. | |
| 2013/0230211 A1 | 9/2013 | Tanabiki et al. | |
| 2013/0244684 A1 | 9/2013 | Kadous et al. | |
| 2013/0326364 A1 | 12/2013 | Latta et al. | |
| 2014/0002439 A1* | 1/2014 | Lynch | G06T 11/00 |
| | | | 345/419 |
| 2014/0160129 A1 | 6/2014 | Sako et al. | |
| 2014/0306891 A1 | 10/2014 | Latta et al. | |
| 2015/0070274 A1* | 3/2015 | Morozov | G02B 27/017 |
| | | | 345/156 |
| 2015/0205362 A1* | 7/2015 | Park | G06F 3/04815 |
| | | | 345/156 |
| 2015/0352441 A1* | 12/2015 | Lin | A63F 13/214 |
| | | | 463/36 |
| 2015/0355462 A1 | 12/2015 | Saito et al. | |
| 2016/0026253 A1 | 1/2016 | Bradski et al. | |
| 2016/0041391 A1 | 2/2016 | Van Curen et al. | |
| 2016/0042569 A1* | 2/2016 | Wyld | G06T 19/006 |
| | | | 345/633 |
| 2016/0049013 A1* | 2/2016 | Tosas Bautista | G06T 19/006 |
| | | | 345/633 |
| 2016/0093108 A1 | 3/2016 | Mao et al. | |
| 2016/0133230 A1 | 5/2016 | Daniels et al. | |
| 2016/0171771 A1* | 6/2016 | Pedrotti | G06F 3/002 |
| | | | 345/633 |
| 2016/0187969 A1* | 6/2016 | Larsen | G06T 19/006 |
| | | | 345/156 |
| 2016/0196687 A1* | 7/2016 | Alpert | G06T 17/05 |
| | | | 345/419 |
| 2016/0253745 A1* | 9/2016 | Lee | G06T 19/006 |
| | | | 705/27.2 |
| 2016/0306431 A1* | 10/2016 | Stafford | G02B 27/017 |
| 2016/0321880 A1* | 11/2016 | Hamam | H04M 1/72481 |
| 2017/0032207 A1 | 2/2017 | Yoon et al. | |
| 2017/0052373 A1 | 2/2017 | Memmott et al. | |
| 2017/0072316 A1 | 3/2017 | Finfter | |
| 2017/0193289 A1 | 7/2017 | Karmon et al. | |
| 2017/0205892 A1* | 7/2017 | Petrovskaya | G06T 17/20 |
| 2017/0221379 A1 | 8/2017 | Onda | |
| 2017/0302709 A1* | 10/2017 | Jones | G06Q 10/109 |
| 2017/0315620 A1 | 11/2017 | Johri | |
| 2017/0332946 A1* | 11/2017 | Kikkeri | G16H 40/63 |
| 2018/0005429 A1* | 1/2018 | Osman | G06T 19/006 |
| 2018/0005441 A1* | 1/2018 | Anderson | G06T 19/006 |
| 2018/0005445 A1 | 1/2018 | McCulloch et al. | |
| 2018/0082565 A1 | 3/2018 | Braiman | |
| 2018/0095635 A1* | 4/2018 | Valdivia | G06F 3/0482 |
| 2018/0108325 A1 | 4/2018 | Schwarz et al. | |
| 2018/0137681 A1* | 5/2018 | Chang | G06F 3/017 |
| 2018/0157398 A1* | 6/2018 | Kaehler | G06N 3/02 |
| 2018/0161624 A1 | 6/2018 | Wrigg | |
| 2018/0214777 A1* | 8/2018 | Hingorani | A63F 13/5255 |
| 2018/0268589 A1* | 9/2018 | Grant | G06T 13/40 |
| 2019/0005848 A1* | 1/2019 | Garcia Kilroy | A61B 34/35 |

FOREIGN PATENT DOCUMENTS

| | | |
|---|---|---|
| WO | 2003075125 | 9/2003 |
| WO | 2013028908 | 2/2013 |

OTHER PUBLICATIONS

"Hololens Inside-out Tracking Is Game Changing for AR & VR, and No One Is Talking about it", Sep. 20, 2016, 4 pages, https://www.roadtovr.com/microsoft-hololens-inside-out-tracking-augmented-reality-virtual-reality-ar-vr/.

"Oculus Rift Officially Brings Room Scale To The VR Platform", May 26, 2017, 4 pages. https://www.gamespot.com/articles/oculus-rift-officially-brings-room-scale-to-the-vr/1100-6450377.

"Shared experiences in mixed reality", Mar. 21, 2018, 7 pages, https://developer.microsoft.com/en-us/windows/mixed-reality/shared_experiences_in_mixed_reality.

"Virtual reality", Wikipedia, Apr. 22, 2018, 14 pages. https://en.wikipedia.org/wiki/Virtual_reality.

International Application No. PCT/US2017/043286 International Search Report and Written Opinion including PCT/SA/220, PCT/ISA/210, and PCT/ISA/237 to Gullicksen Brothers, LLC, dated Jan. 18, 2018, 23 pages.

* cited by examiner

MANAGING VIRTUAL CONTENT DISPLAYED TO A USER BASED ON MAPPED USER LOCATION

CROSS-REFERENCE TO RELATED APPLICATIONS

This application is a continuation of U.S. application Ser. No. 15/656,500, filed Jul. 21, 2017, which claims priority to the following:

U.S. Provisional Application No. 62/378,486, filed Aug. 23, 2016 and entitled "SECURE HUB FOR DISPATCH OF RIGHTS AND VERIFICATION OF IDENTITY, USING A UNIFORM AUTHENTICATION METHOD WITH MULTI-FACTOR VARIABLE AUTHENTICATION STRENGTH;"

U.S. Provisional Application No. 62/378,494, filed Aug. 23, 2016 and entitled "VIRTUAL SENSITIVE COMPARTMENTED INFORMATION FACILITY;"

U.S. Provisional Application No. 62/378,498, filed Aug. 23, 2016 and entitled "UNIVERSAL CONTROLLER FOR REAL AND VIRTUAL OBJECTS IN THREE DIMENSIONAL SPACE;"

U.S. Provisional Application No. 62/397,226, filed Sep. 20, 2016 and entitled "SYSTEM FOR AUGMENTED REALITY REFERENCED TO A COMMON COORDINATE SYSTEM IN REAL THREE-DIMENSIONAL SPACE, INCLUDING METHOD FOR CONTROL AND MOVEMENT OF VIRTUAL OBJECTS BETWEEN SEPARATE PHYSICAL SPACES;" and U.S. Provisional Application No. 62/491,048, filed Apr. 27, 2017 and entitled "COEXTENSIVE REALITY SYSTEM."

The contents and teachings of each of the provisional patent applications listed above are incorporated herein by reference in their entirety.

BACKGROUND

VR (virtual reality) enables users to enter immersive, virtual environments without leaving the comfort and safety of their physical environments. Users of VR technology can move through virtual spaces and interact with rendered content, such as 3-D (three dimensional) representations of objects, scenery, and other users. At the center of VR technology is the VR headset, which displays images onto opaque screens placed in front of a user's eyes, allowing the user to visualize displayed content in three dimensions. The VR headset typically includes accelerometers and other sensors, which provide input to a 3-D rendering engine, such that the user can change the displayed view of the virtual environment by making natural head movements. The VR headset typically also includes speakers and a microphone, which allow users to hear sounds in the virtual environment and to communicate with others. The user may control a VR application, such as a game, virtual walk-through, or other application using a hand-held controller. A well-known example of a VR headset is the Oculus Rift, available from Oculus VR, LLC.

AR (augmented reality) allows users to continue to see their physical environments through display screens while additional content is superimposed. AR thus provides a vehicle for adding synthetic content to users' normal views of their environments. An example of AR technology is Google Glass.

MR (mixed reality) extends and combines the capabilities of VR and AR by placing synthetic objects at locations referenced to objects in the user's physical environment. An MR headset may scan local surroundings many times per second to learn the locations of walls, ceilings, floors, and objects. As it does so, the MR headset displays holograms via transparent display screens, such that the holograms appear superimposed on objects in the user's natural environment. Displayed holograms may appear stationary in physical space, even as the user moves, or they may move through the environment in natural-looking ways. MR technology thus provides a means for displaying synthetic content alongside actual, physical objects in a user's own physical environment and creates an illusion that the holograms are part of the physical environment. A well-known example of an MR headset is the Microsoft HoloLens, which is available from Microsoft Corporation of Redmond, Wash.

SUMMARY

VR technology provides highly immersive environments, but users must typically stay in fixed locations as they operate the technology. Users of VR headsets cannot generally see their own physical environments while they are wearing the headsets. Indeed, a main objective of VR is to virtually transport users to different spaces. AR and MR technologies maintain a user's view of the local environment while adding virtual content. Unfortunately, however, most current AR and MR applications are limited by what can be seen directly by the headsets. Knowledge of local environments is thus highly dependent on images captured by the AR or MR headsets. As a result, these technologies tend to work best in a single room and with a single user. Additional capabilities are required to realize the full promise of AR and MR technologies.

In contrast with conventional VR, AR, and MR systems, an improved technique for rendering virtual content to a user stores map data of features in a physical environment of the user and measures the location of the user with stationary sensors placed at respective locations within the environment. A server provides the location of the user and portions of the map data to a headset worn by the user. The headset is thus enabled to render virtual content at apparent locations that are based on the measured location of the user and the features described by the map data.

Advantageously, the improved technique benefits from a perspective of the user's environment that is more global than what could normally be achieved using an AR or MR headset alone, as such headsets are generally limited to local perspectives from vantage points of the headsets themselves. The global perspective provides advantages for many software applications, particularly for games. For example, a user can set up a play zone within the user's own house or apartment, with boundaries and features of the play zone mapped and stored on the server. An application may provide virtual content superimposed on physical features in the play zone, with the play zone potentially spanning multiple rooms, stories, and/or outdoor spaces, provided they are mapped and within range of the sensors.

In examples where applications involve multiple users, the server may track locations of users in the same physical space and maintain a global perspective of all of them, such that the server maintains all user locations even when the user have no line of sight to one another.

In some examples, applications can span multiple physical spaces, with each physical space mapped and equipped with sensors. For example, a user can share the map of a play zone with other users in other locations. The other users' headsets may render the sharing user's play zone as a virtual space, and users can interact in the same play zone via avatars. For example, the sharing user sees the other users' avatars in the sharing user's own physical space, while each remote user sees the sharing user and the other remote users as avatars in a virtual space, which resembles the physical play zone.

In some examples, the server may filter shared map information sent to other users to protect privacy. The server may also apply artificial content, e.g., coverings, colors, textures, etc., to provide simplified and/or stylized renderings of physical features in the play zone.

In some examples, a user can apply wearable sensors to the user's body and execute a series of predetermined movements, from which the headset and/or server may generate a 3-D skeletal model of the user. Skins and/or clothing may be applied to the skeletal model to create a 3-D avatar, which moves in synchronization with the user. Thus, as the user moves, so too does the avatar move in a like manner.

In some examples, the wearable sensors and skeletal model allow the user to convey control commands by performing predetermined movements. For example, the server maps certain movements of the user's arms, legs, and/or torso to particular commands, e.g., for controlling an application, such as a game, which commands the server may execute upon detection. Because the server detects user movements based on input from the wearable sensors, there is no need for user movements to be within the field of view of the headset.

In some examples, the server may generate virtual content in the form of scenes, where a "scene" includes a collection of holograms and virtual interconnects. A "hologram" is a synthesized 3-D image, and a "virtual interconnect" is an identified space in the play zone that a user may enter to perform an action. Such actions may include, for example, rotating a virtual play zone (e.g., to accommodate a physical space inconsistent with the virtual play zone), teleporting to a different location in the virtual play zone, or entering a VR play area, e.g., an entirely synthetic VR realm.

Certain embodiments are directed to a method of managing virtual content to be displayed to users via three-dimensional imaging headsets. The method includes measuring locations of a user in a physical space as the user moves through the physical space, by a server apparatus receiving inputs from multiple stationary sensors positioned at respective sensor locations within the physical space and processing the inputs to generate the locations of the user. The method further includes storing map data that describes a map of the physical space and specifying a set of holograms that have apparent locations that are defined relative to the map data. The method still further includes providing the measured locations of the user and at least a portion of the map data to a headset worn by the user, to enable the headset to render the set of holograms at the apparent locations relative to the map data and from a user perspective based on the measured locations of the user.

Other embodiments are directed to a computerized system constructed and arranged to perform a method of managing virtual content to be displayed to users via headsets, such as the method described above. Still other embodiments are directed to a computer program product. The computer program product stores instructions which, when executed on control circuitry of a computerized system, cause the computerized system to perform a method of managing virtual content to be displayed to users via headsets, such as the method described above.

Further embodiments include methods of generating skeletal models of users, methods of interpreting user movements as control commands, methods of calibrating positions and/or orientations of wearable sensors, methods of reorienting virtually-rendered spaces via virtual interconnects, methods of teleporting users between virtual spaces via virtual interconnects, and methods of entering and exiting VR realms. Still further embodiments are directed to wearable sensors, sensor platters, MR headsets, game consoles, location positioning systems, and security vaults, for implementing any of the above methods, as well as to computer-readable media from which software instructions for carrying out such methods may be installed. Some embodiments involve multiple components, which may be deployed over a computer network.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for rendering virtual content to a user stores map information describing a physical environment of the user and measures the location of the user with stationary sensors placed at respective locations within the environment. The improved technique provides software applications, such as games and virtual walk-throughs, with a global perspective of users and their locations relative to virtual content.

Figure 1:
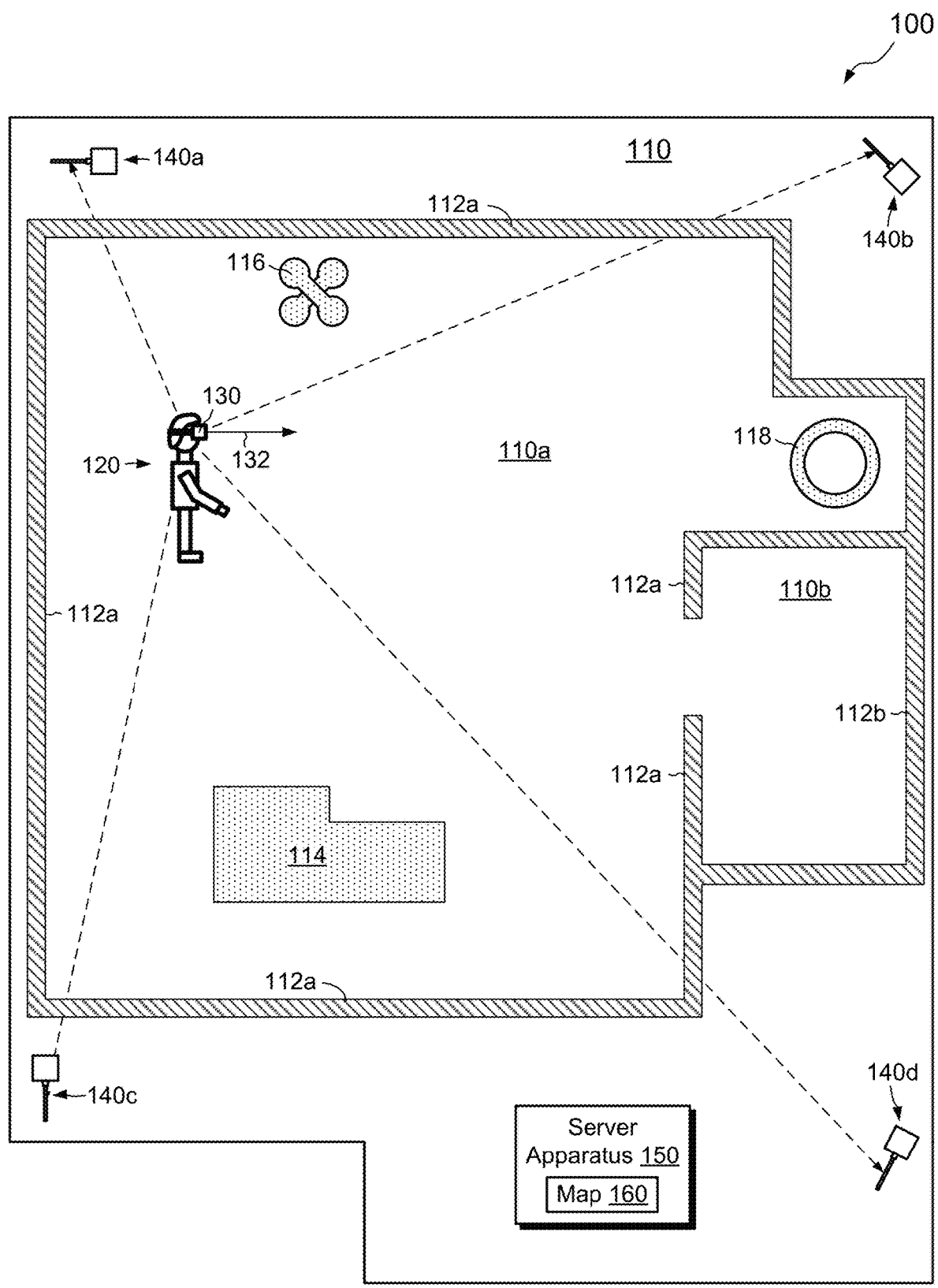
FIG. 1 is a top, plan view of an example physical space and electronic environment in which the improved technique hereof can be practiced.

FIG. 1 shows an example environment 100 in which embodiments of the improved technique hereof can be practiced. Here, a user 120 is seen moving through a physical space 110. The physical space 110 includes rooms 110a and 110b and walls 112a and 112b. The user 120 wears a three-dimensional imaging headset 130, such as an AR (augmented reality) or MR (mixed reality) headset, which is capable of displaying holograms via display elements positioned in front of the user's eyes. The display elements in the headset 130 are transparent or translucent, such that the user 120 is able to look directly through the display elements to see the immediate surroundings. In the usual way, the headset 130 may project holograms, via the display elements, that appear fixed in relation to physical features in the physical space 110, such as floors, ceilings, walls, and other physical objects.

Positioned at multiple locations in the physical space 110 are respective stationary sensors 140 (e.g., 140a-140d). Each of the sensors 140 is coupled to a server apparatus 150 using wired and/or wireless connections. The sensors 140 are configured to detect the presence of the user 120 and to provide detection information as inputs to the server apparatus 150. The server apparatus 150 is configured to process the inputs from the sensors 140 and to measure therefrom the 3-D locations of the user 120 in the physical space 110. The server apparatus 150 is further configured to store map data 160, which describes physical features of the physical space 110, such as locations, sizes, and orientations of walls, floors, ceilings, furniture, stairways, doors, windows, and the like.

The server apparatus 150 specifies holograms (virtual objects) relative to the map data 160. For example, each hologram has a location, dimensions, and an orientation that is aligned with a coordinate system of the map data 160. Example holograms 114, 116, and 118 are shown. These holograms are not physical features but rather virtual features that the headset 130 may render such that they appear to be present in the indicated locations from the perspective of the user 120 through the headset 130. The server apparatus 150 may further specify holograms as artificial coverings (e.g., skins) on physical objects present in the physical space 110, such as on walls 112a and 112b. In some examples, virtual objects are constructed around physical objects. For example, hologram 114 may be shown as a garden whereas in fact it covers a physical object, such as a sofa.

In example operation, the server apparatus 150 receives a stream of inputs from the sensors 140 and generates measured locations of the user 120 as the user moves around in the physical space 110. In this example, the location of the user 120 is taken as the location of the headset 130 worn by the user 120. The server apparatus 150 sends the measured user location, information about holograms, and map data 160 (or portions thereof) to the headset 130. The headset 130 processes the user location and map data 160 to render the holograms. For example, the headset 130 applies hologram information and map data 160 to generate a virtual model of objects within its line of sight 132, based on the headset's current 3-D location and orientation. The headset 130 then renders the holograms that fall within the headset's field of view. The user 120 is thus able to see virtual objects 114, 116, and 118 placed in their proper locations and orientations within the physical space 110.

By processing the map data 160, hologram information, and user locations, the server apparatus 150 constructs a global perspective of the physical space 110 that includes all the physical and virtual content within the physical space 110, including the user 120. The server apparatus 150 may share elements of this global perspective with the headset 130 and/or with other components.

In the example shown, the sensors 140 are realized in the form of antennas that detect Wi-Fi (IEEE 802.11) signals emanating from the headset 130, as well as from other wireless devices in the vicinity. In response to an antenna detecting a wireless signal, such as a Wi-Fi packet, the antenna sends information about the detection to the server apparatus 150, which processes the information along with similar detection information from other antennas to locate the source of the wireless signal. An example of this approach is described in greater detail in U.S. patent application Ser. No. 15/452,451, filed Mar. 7, 2017 and entitled "CONTROLLING ACCESS TO A COMPUTER NETWORK USING MEASURED DEVICE LOCATION," which is incorporated herein by reference. Using the approach disclosed in the incorporated document, the server apparatus 150 is able to measure the location of headset 130 to within an accuracy of single centimeters.

One should appreciate that antennas can be used to locate objects using a variety of techniques, and that the invention hereof is not limited to the particular ones disclosed in the incorporated document. Also, sensors besides antennas may be used in various embodiments, such as cameras, sonic transducers, and the like.

The map data 160 may incorporate information from a variety of sources. For example, the user may direct the server apparatus 150 to enter a learning mode, whereupon the user proceeds to walk around a perimeter of the physical space 110 while wearing the headset 130 (or carrying some other wireless device detectable by the sensors 140). As the user does so, the server apparatus 150 receives inputs from the sensors 140, generates user locations therefrom, and follows the user's movements to define the perimeter of the space. In some examples, input from one or more cameras in the headset 130 augments the location information to create a more precise map of the physical space 110, e.g., the precise locations of walls, floors, ceilings, and the like, as imaged by the camera(s) and aligned with the measured locations. One should appreciate that the physical space 110 may span multiple rooms, stories, and even outdoor spaces, provided such spaces are within range of the sensors 140.

In some examples, additional map data 160 may derive from a software application. For example, a game or other application may define particular rooms, realms, spaces, and other artificial content, which the server apparatus 150 receives and may integrate into the map data 160 at suitable locations and orientations relative to the physical space 110.

In some examples, the user operates a software program to define custom features, such as coverings, objects, walls, and the like, which the server apparatus 150 may locate relative to the map data 160 at user-defined locations. Also, as will be described in more detail below, input from other physical spaces may also be received and located relative to the map data 160, e.g., to enable the user 120 to visualize features in distinct physical spaces in a manner that is aligned with the user's own physical space 110.

Figure 2:
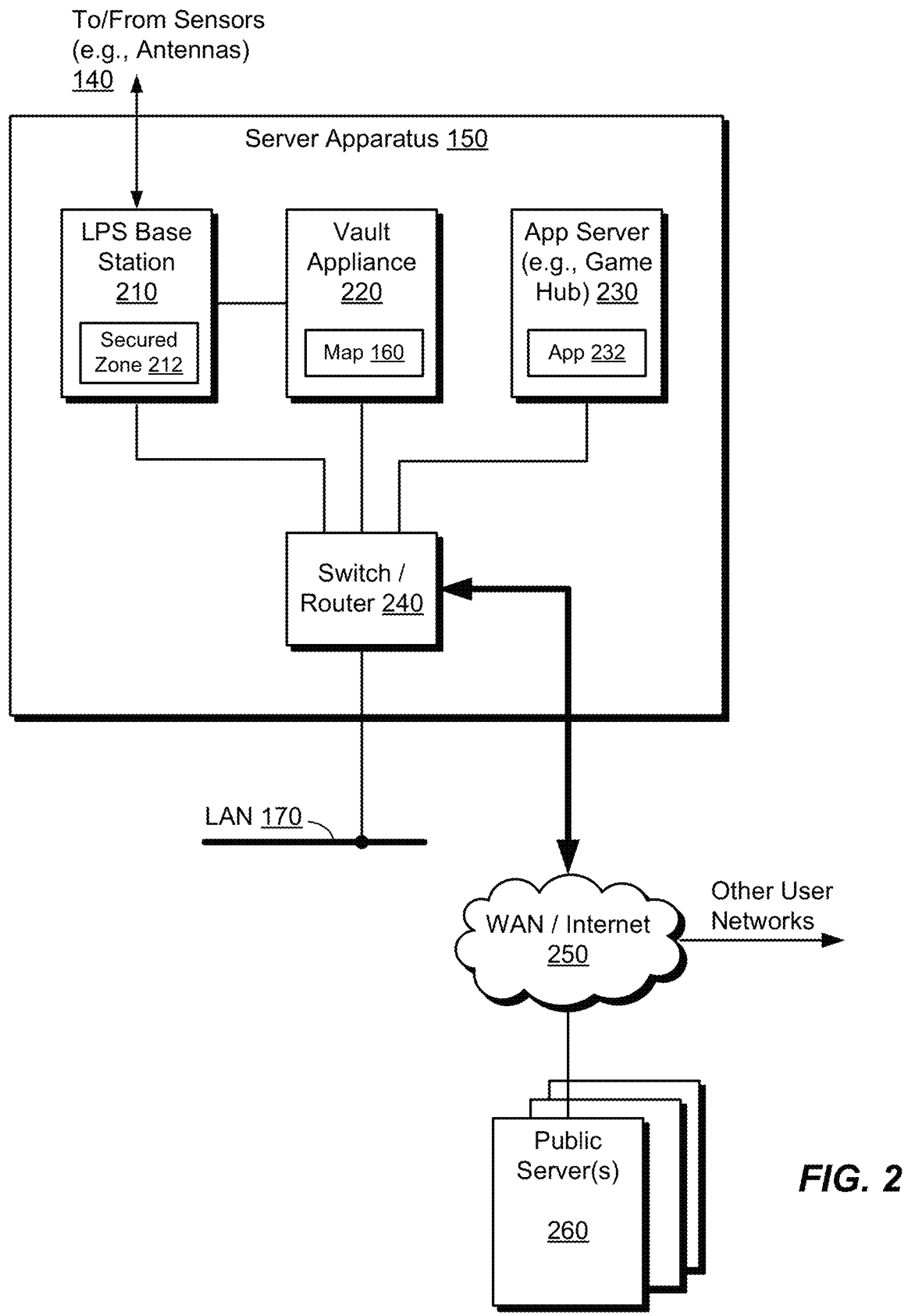
FIG. 2 is a block diagram of example electronic componentry that may be used in connection with the electronic environment of FIG. 1.

FIG. 2 shows an example of the server apparatus 150 and related components in additional detail. Here, the server apparatus 150 includes an LPS (local positioning service) base station 210, a vault appliance 220, an application server 230 (such as a game hub), and a switch/router 240. In various examples, these components may be provided separately, as a single integrated unit, or as any combination of physical units.

The LPS base station 210 receives inputs from the sensors (e.g., antennas) 140 and generates therefrom locations of the headset 130, as well as locations of other Wi-Fi devices in the vicinity. In an example, the LPS base station 210 measures device locations using wireless packets (e.g., Ethernet Wi-Fi packets), which the devices emit as part of their normal communications. The LPS base station 210 maintains a 3-D map of a secured zone 212 within range of the sensors 140. The secured zone 212 defines a region relative to the physical space 110 in which Wi-Fi communications with the switch/router 240 are permitted. Packets received by the LPS base station 210 are allowed to pass to the switch/router 240 only if those packets originate from a device confirmed to be located within the secured zone 212. Further details of location measurement using antennas and an LPS base station 210 may be found in the above-incorporated U.S. patent application Ser. No. 15/452,451 ("CONTROLLING ACCESS TO A COMPUTER NETWORK USING MEASURED DEVICE LOCATION").

The vault appliance 220 is a secure hub for storing and dispatching rights. Such rights may include content rights for accessing particular content, communication rights for establishing communications with another party, and action rights for performing actions on particular devices or elements. For example, the vault appliance 220 may securely store the map data 160, or portions thereof, and may securely control the release of such map data 160 using content rights and/or communication rights. Further details of the vault appliance 220 may be found in U.S. patent application Ser. No. 15/347,551, filed Nov. 9, 2016 and entitled "VAULT APPLIANCE FOR IDENTITY VERIFICATION AND SECURE DISPATCH OF RIGHTS," the contents and teachings of which are incorporated by reference herein.

Features of the LPS base station 210 and vault appliance 220 promote security and provide other benefits, but their particular details should be regarded as optional unless otherwise specified.

The application server 230 is a computerized device configured to run software applications, such as an application 232. The application server 230 may be implemented as a general purpose computer or as a specialized system, such as a game hub. The game hub may be similar to conventional game consoles (e.g., X-BOX, PlayStation, etc.) but is adapted to work with MR (mixed reality) games and to participate in the particular procedures and protocols as described herein. In the conventional way, the game hub may download games and other content over the Internet. It may also receive content via conventional software media, DVDs, Blu-ray disks, etc.

The switch/router 240 may have a conventional design. For example, the switch/router 240 has LAN (Local Area Network) ports for connecting to the LPS base station 210, vault appliance 220, and application server 230, as well as for distributing a wired LAN 170 throughout the physical space 110. The switch/router 240 may also have a WAN (Wide Area Network) port, for connecting to a WAN/Internet 250. In some examples, the switch/router 240 is a wired device only, with wireless services performed by the LPS base station 210, e.g., using one or more of the antennas. In other examples, the switch/router 240 directly supports both wired and wireless communications.

Using the WAN port, the switch/router 240 may connect to one or more public servers 260. These may include on-line stores (e.g., for buying games) and various servers to support vault-based communications. The switch/router 240 also supports communication over the WAN/Internet 250 with similarly-configured networks of other users, e.g., to support multi-player games or other applications across different local networks and locations.

Although not specifically shown, one should appreciate that the LPS base station 210, the vault appliance 220, and the application server 230 each include their own processing circuitry and memory. Each memory may store instructions which, when run by the respective processing circuitry, cause the processing circuitry to carry out various procedures and activities as described herein. Unless otherwise specified, one should appreciate that any activities ascribed to the server apparatus 150 may be performed by any of the included components, or by any combination of such components.

Figure 3:
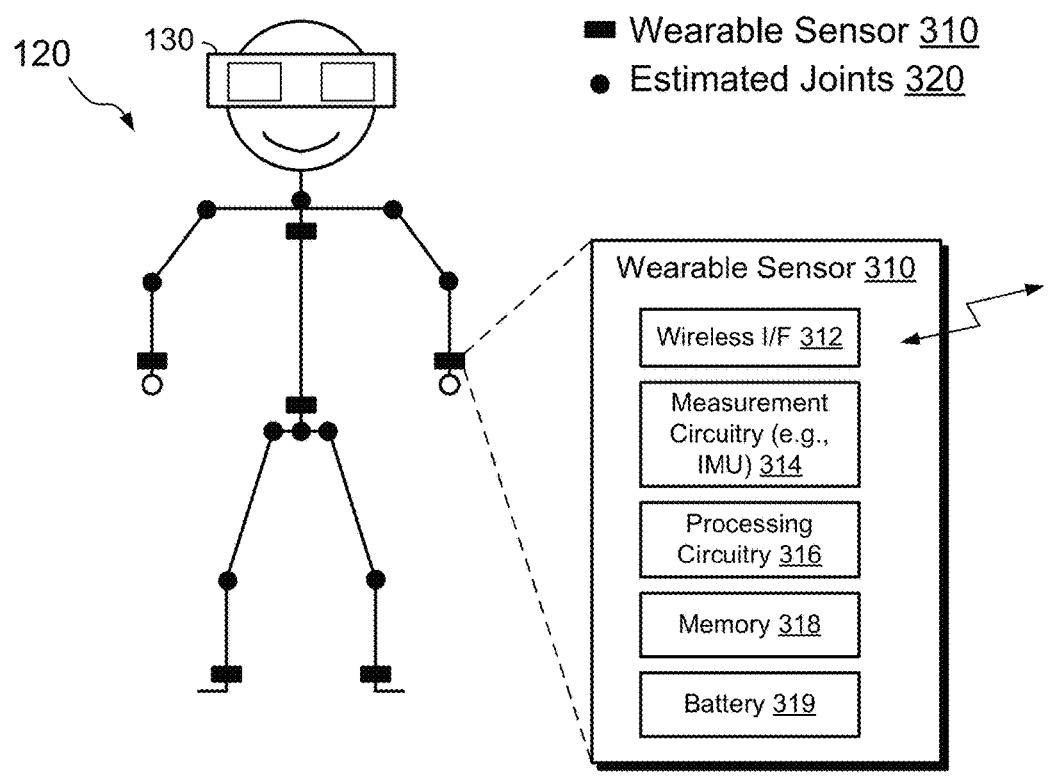
FIG. 3 is a schematic view of a user equipped with example wearable sensors.

FIG. 3 shows a schematic view of the user 120 wearing the headset 130 as well as various wearable sensors 310. The headset 130 and the wearable sensors 310 track the user's movements and enable the server apparatus 250 to construct a skeletal model of the user 120. The resulting skeletal model has two main uses. First, it enables the server apparatus 150 to track the user's body pose and movements, such that the server apparatus 150 can construct a sharable model of the user that moves in synchronization with the user. Second, it enables the server apparatus 150 and/or the headset 130 to map user movements to a motion-based set of control commands. For example, the server apparatus 150 and/or headset 130 may interpret particular movements of the user's head, arms, legs, and/or torso as control commands, which are interpreted to initiate particular activities.

In the figure, solid rectangles indicate locations of wearable sensors 310. As shown, six wearable sensors 310 may be used, one on the torso, one on the waist, one on each wrist, and one on each ankle. The wearable sensors 310 may be applied to the body using straps, adhesives, using a specialized garment, or in any other suitable way. Although no sensor is shown in the headset 130, one should appreciate that the headset 130 may include circuitry for performing the functions of a wearable sensor.

Each wearable sensor 310 is seen to include a wireless interface 312 (Wi-Fi, Bluetooth, etc.), measurement circuitry 314, processing circuitry 316, memory 318, and a battery 119. The measurement circuitry 314 may include one or more accelerometers, gyroscopes, magnetometers, and the like, for measuring changes in position and orientation in 3-D space. In operation, each wearable sensor 310 is caused to generate sensor output, which may be read by the headset 130 and/or by the server apparatus 150. In some examples, the wearable sensors 310 process raw sensor data and generate their output in the form of higher-order information, such as changes in position (relative to some starting point) and orientation (relative to some starting orientation).

To get the full benefit of the wearable sensors, the user 120 may execute a training procedure. An objective of the training procedure is to estimate joint locations (shown as solid circles 320) and limb lengths of the user, based on how the wearable sensors 310 move during the training procedure.

Figure 4:
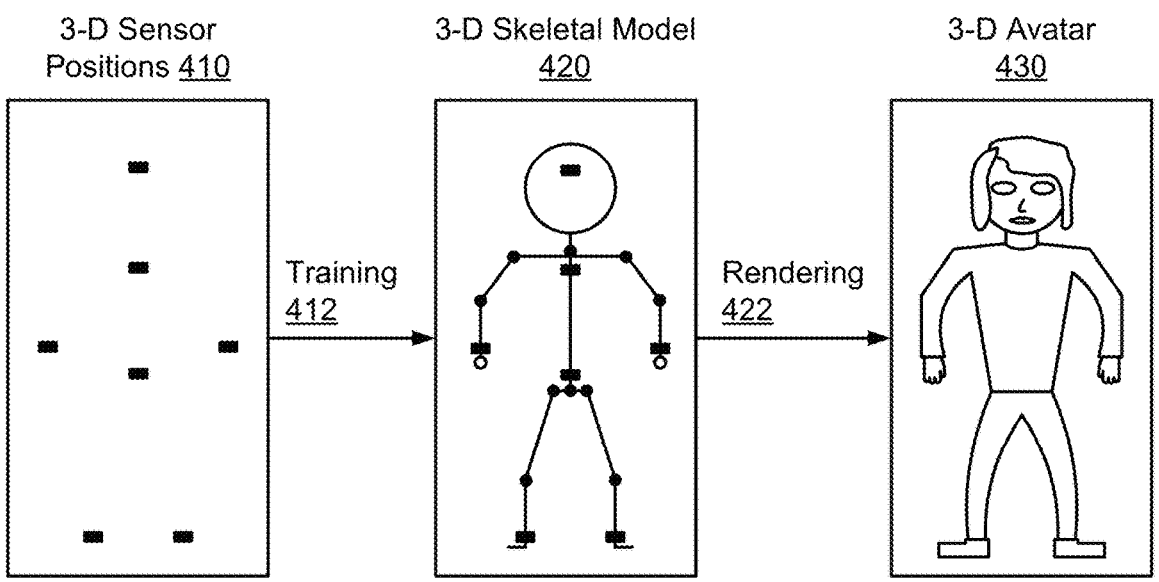
FIG. 4 is a diagram of an example arrangement for generating a 3-D skeletal model and a 3-D avatar of the user of FIG. 3.

As shown in FIG. 4, the training procedure 412 measures 3-D positions 410 of the wearable sensors 310 as the user 120 executes a set of predefined movements. The result of the training procedure 412 is a 3-D skeletal model 420 of the user, which estimates the user's joint locations and limb lengths. Based on the skeletal model 420, a rendering step 422 may generate a 3-D avatar 430 of the user 120. In some examples, the application server 230 (e.g., a game hub) directs the training procedure 412 and stores the skeletal model 420 of the user 120. However, generation of the avatar 430 from the skeletal model 420 may be initiated by particular applications. For example, users may represent themselves with different avatars 430 in different games, but with all such avatars 430 based on the same body geometries. The application server 230 and particular applications may support multiple users, with each user having his or her own skeletal model and avatar.

To generate a skeletal model 420, the system (headset 130 and server apparatus 150) assumes that the user's shoulder, hip, neck, and waist joints are ball-and-socket joints and that knee and elbow joints are hinges. The system guides the user through the training procedure 412. In an example, the headset 130 projects a mirror image of the skeletal model 420 to the user as the user performs the procedure. Auditory controls may guide the user through the procedure, which may include the following steps:

User stands upright with feet together and arms relaxed to the side. This pose/position provides the baseline height measurements of all wearable sensors 310. Because the arms are relaxed to the side, the pose also gives an estimate of shoulder width.

User turns head to the left, to the right, touches chin to chest, and tilts head upward. These motions provide an estimate of the neck location (assumed to be a ball joint).

User bends left elbow and, with left hand extending straight from forearm, touches right elbow crease with middle finger. User repeats on other side. These actions provide locations of the elbows.

User extends both arms straight in front at shoulder height. This movement provides another estimate of the shoulder joint location. This time, shoulder height and width are estimated from the wrist sensors.

User rests arms to the side and then bends elbows at 90 degrees. The user rotates palms to face each other, then palms up, and finally palms down. These movements verify the range of motion of the wrist joint and the effect of turning on forearm estimation.

The user locks both legs straight. The user takes one large side step with a single foot directly to the side, then relocks legs straight. User then brings feet back to neutral underneath the hips. These motions provide an estimate of the leg length (hip height) and hip width.

User bends knees slightly and touches the wrist bands to the outside of the knee joint. This gives an estimate of knee height.

User kneels on a single knee with waist as high as possible. This provides an estimate of knee location.

User stands with feet on the ground, and turns torso to the left, and then back to the right. This provides the range of motion on the joints of the lumbar spine.

Location and position of joints may also be enhanced by taking into account the headset view of the body, particularly elbow and knee, during the training above.

In addition, location and position of joints may also be enhanced by taking into account the user's view of the body as projected by the headset 130, e.g., by receiving user feedback. One should appreciate that the order of the above movements can be varied in any sensible way.

As the wearable sensors 310 are wireless devices, the antennas 140 and the LPS base station 210 may track their locations as described above, e.g., based on packets emitted by the wearable sensors 310. In addition, the wearable sensors 310 may report their own orientations, e.g., by reading their internal measurement circuitry 314 and transmitting the results.

Thus, in one example, the server apparatus 150 measures the locations of the wearable sensors 310 the same way it measures the location of the headset 130 (using packets). In other examples, a different approach may be used.

For instance, the accuracy with which a device's location can be measured may be proportional to the frequency of the Wi-Fi signals that the device transmits. But Wi-Fi frequency is proportional to power usage. Thus, to conserve battery life, it may be preferred to use lower-power 2.4 GHz Wi-Fi for the wearable sensors applied to the body, but to use 5.0 GHz Wi-Fi for the headset 130. Although the use of lower-frequency Wi-Fi may result in a loss of location accuracy for wearable sensors 310, accuracy can be restored using the measurement circuitry 314 within such sensors.

Figure 5:
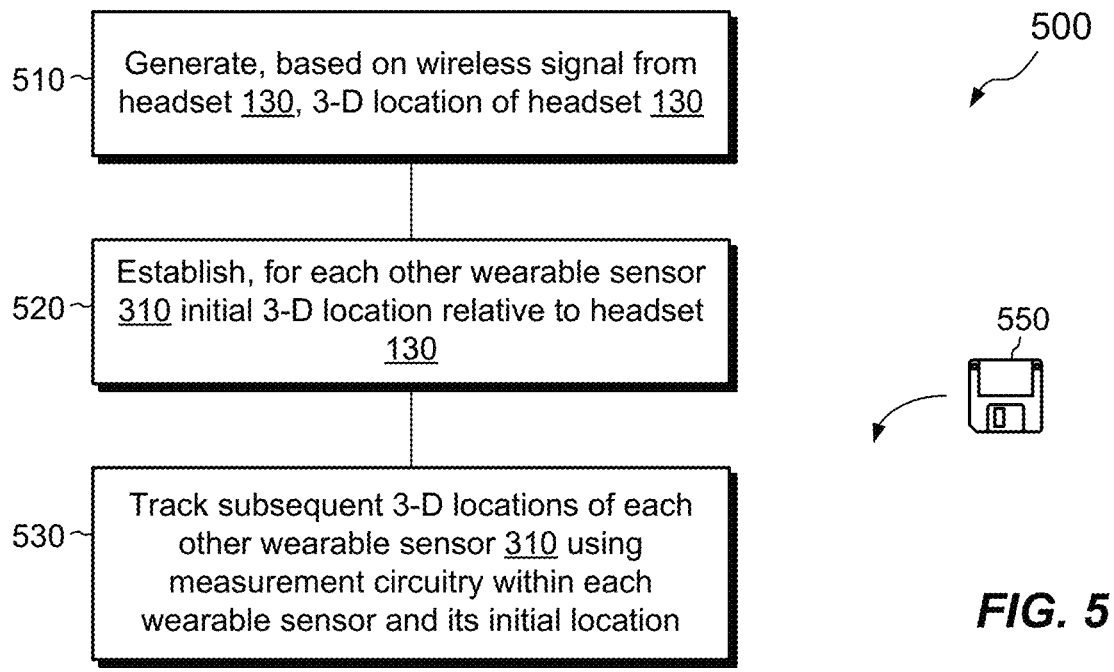
FIG. 5 is a flowchart showing an example method for tracking 3-D locations of the wearable sensors of FIG. 3.

For example, FIG. 5 shows an example arrangement 500 for accurately measuring locations of wearable sensors 310 attached to the body using low-power communications.

At 510, an accurate location of the headset 130 is generated based on wireless signals from the headset itself. For example, the headset 130 emits 5 GHz Wi-Fi packets, which the antennas (140) detect and which the LPS base station 210 uses to measure the location of the headset 130 precisely, e.g., to within some single number of centimeters.

At 520, an initial 3-D location of each of the wearable sensors 310 is established relative to the headset 130. For example, the user 120 may place each wearable sensor 310 adjacent to an object having known dimensions. The user 120 may then point the line of sight 132 of the headset 130 toward the object and direct the headset 130 to compute a precise location in space of the wearable sensor 310 relative to the headset's own location. This location is also relative to the physical space 110, as it is based on the headset's location as measured by the accurate antenna/LPS system. The headset 130 may simultaneously query the wearable sensor 310 to obtain its self-reported location as indicated by the measurement circuitry 314 within the wearable sensor. This self-reported location may be used as a baseline going forward. For example, the headset 130 may compute a 3-D correction vector based on a difference between the initial location of the wearable sensor 310 as reported by the headset 130 and the self-reported location as reported by the wearable sensor 310.

At 530, the user 120 may place the wearable sensor 310 on the body, such as on the wrist. As the user moves, the headset 130 may again query the wearable sensor 310 for its self-reported location, correcting the measured values by applying the 3-D vector. Similar activities may be performed for other wearable sensors.

Figure 6:
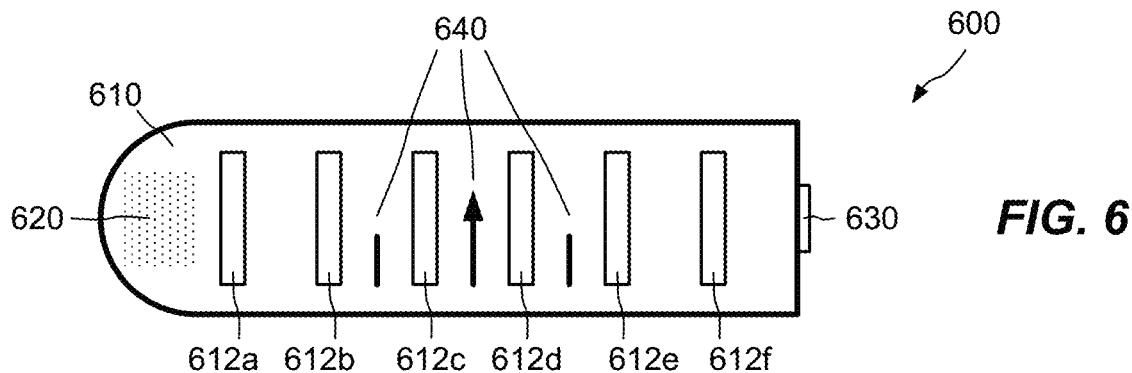
FIG. 6 is a top view of an example sensor platter, which is suitable for holding wearable sensors and which may be used for establishing initial locations of the wearable sensors.

FIG. 6 shows an example sensor platter 600 that may be used for establishing initial locations of the wearable sensors 310. The sensor platter 600 has a substrate 610, such as a printed circuit board, and docking locations 612a-612f for receiving wearable sensors 310. The sensor platter 600 may also have a grip region 620 and a charging connector 630. Visual identification marks 640 are printed on the substrate 610 to facilitate the measurement of distance and perspective by the headset 130.

Users may remove wearable sensors 310 from their straps and insert them into designated docking locations 612a-612f. In some examples, the docking locations and sensors are keyed, such that each wearable sensor 310 may be inserted into only one docking location. Upon insertion, each wearable sensor electrically connects to charging contacts (not shown) within the docking location. The charging contacts are coupled to the charging connector 630, e.g., using circuit board traces. The charging connector 630 may be plugged into an electrical source, such as an AC adapter or USB connector, such that the sensor platter 600 may also function as a charging port.

With the wearable sensors 310 inserted into the sensor platter 600, the user 120 may calibrate the wearable sensors 310 by wearing the headset 130 and pointing the line of sight 132 toward the visual indication marks 640. As the locations of the wearable sensors 310 relative to the sensor platter 600 are known and the visual indication marks 640 have a known size and direction (as indicated by the arrow), the headset 130 can compute the location of each wearable sensor 310 relative to the headset 130, and can thus establish the initial 3-D locations of all of the wearable sensors 310 at once.

It is expected that the measurement circuitry 314 within the wearable sensors 310 may drift over time. Such drift may degrade proper rendering of avatar movements and may cause errors to arise in interpreting control commands.

Figure 7:
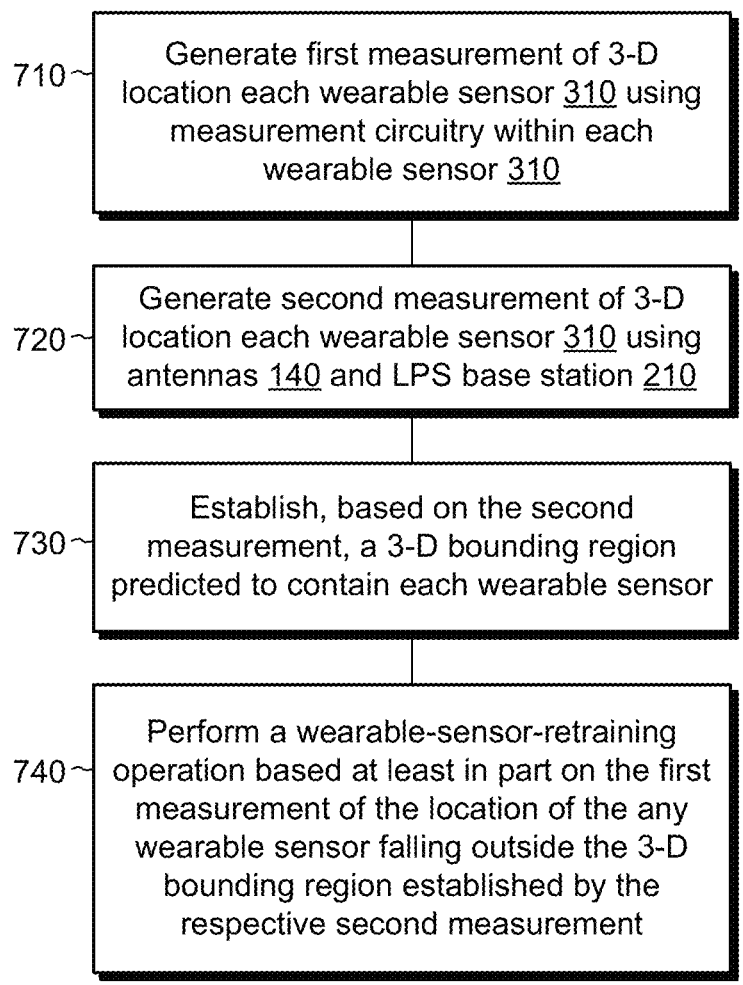
FIG. 7 is a flowchart showing an example method for detecting a need to retrain one or more of the wearable sensors and for initiating a retraining operation.
Figure 7:

FIG. 7 shows an example method 700 for detecting the need to retrain wearable sensors 310 and for initiating such retraining.

At 710, first measurements are made of wearable sensor locations by querying the measurement circuitry 314 in the wearable sensors 310 and applying correction vectors, e.g., as described in connection with the method 500 above.

At 720, second measurements are made of wearable sensor locations. In this case, however, the measurements are made more directly using the antennas (140) and LPS base station 210, i.e., the same way the location of the headset 130 is measured.

At 730, a 3-D bounding region is generated for each of the second measurements. Each 3-D bounding region represents a volume in space that is predicted to contain the respective wearable sensor 310. This bounding region may be regarded as an error band around the second measurements, which may be made, for example, using 2.4 GHz (low power) Wi-Fi.

At 740, the system determines whether the first measurement for any wearable sensor 310 falls outside the respective 3-D bounding region for that wearable sensor. If so, the system initiates a wearable-sensor-retraining operation at the first opportunity. For example, the system may wait until the user 120 enters a designated region, such as the region indicated by object 118 in FIG. 1. The user 120 may previously have been instructed to assume a neutral body pose when standing within that region, such as standing up straight with arms at the sides. For example, assuming this pose may be pre-arranged as part of normal game play. Upon detecting that the user has entered the region indicated by object 118, the system measures the locations of the wearable sensors 310 using the measurement circuitry 314 (as done in the first measurements, above), and compares the sensor locations with expected locations based on the skeletal model 420. The system then generates a new correction vector for each wearable sensor 310 and applies the new correction vectors going forward.

One should appreciate that other occasions may be appropriate for correcting sensor drift, as well. For example, the system may issue a command to the user to assume the neutral pose at any suitable time.

Figure 8:
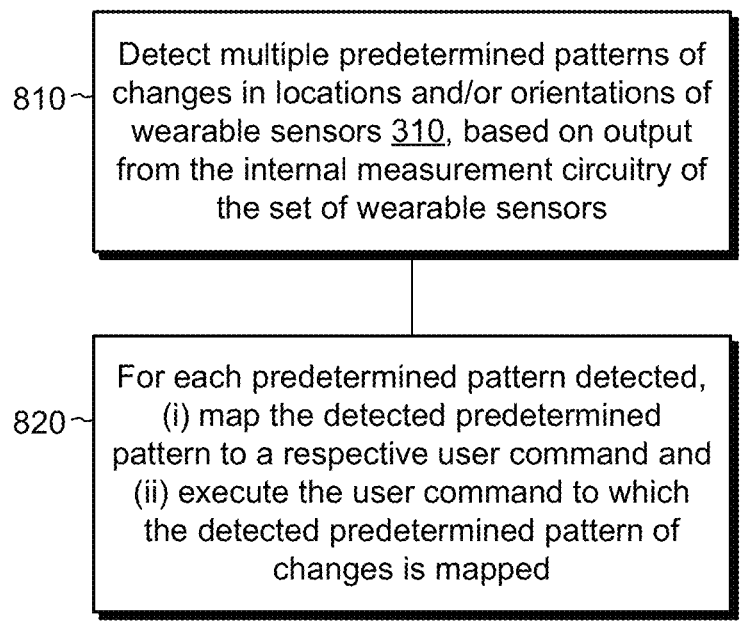
FIG. 8 is a flowchart showing an example method of detecting patterns of changes in locations and/or orientations of wearable sensors and mapping those patterns to user commands.
Figure 8:
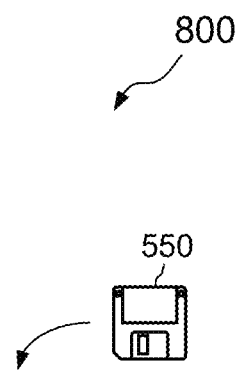

Once the wearable sensors 310 have been trained, users may issue control commands by moving their limbs and/or torso in predetermined ways. As shown in FIG. 8, the method 800 may detect predetermined patterns of changes in locations and/or orientations of the wearable sensors (step 810) based on output from the measurement circuitry 314 in the wearable sensors 310. For example, the measurement circuitry 314 in the wearable sensors 310 reports changes in position and/or orientation of each sensor, which the headset 130 and/or server apparatus 150 processes to detect predetermined patterns. For each predetermined pattern detected, the system may map that pattern to a respective control command and then execute the mapped-to control command (step 820). Some examples of predetermined patterns of movement are as follows:

Quick internal rotation of wrists;
Quick external rotation of wrists;
Raising elbows and bringing forearms to vertical position;
Moving both arms forward (or back);
Pushing one wrist forward while pulling the other back.
Simulating turning a steering wheel (each direction);
Shift weight onto one leg (each leg);
Shift weight forward (or back);
Rotating torso right (or left);
Bending forward (or leaning back).

These are merely examples of predetermined patterns of movements, which the system may map to user commands. Other movements besides these may be used, as well, provided they can be detected reliably by the wearable sensors and are not movements that the user is likely to perform accidentally. Also, movements may be combined in particular sequences to establish predetermined patterns.

In some examples, the system allows users to enter a VR (Virtual Reality) mode and to enter control commands using predetermined movements, such as those described above. In VR mode, predetermined patterns of movement may map intuitively to VR actions. For example, shifting weight to the right leg may map to a command for dodging to the right. Bending forward may map to ducking.

Figure 9A:
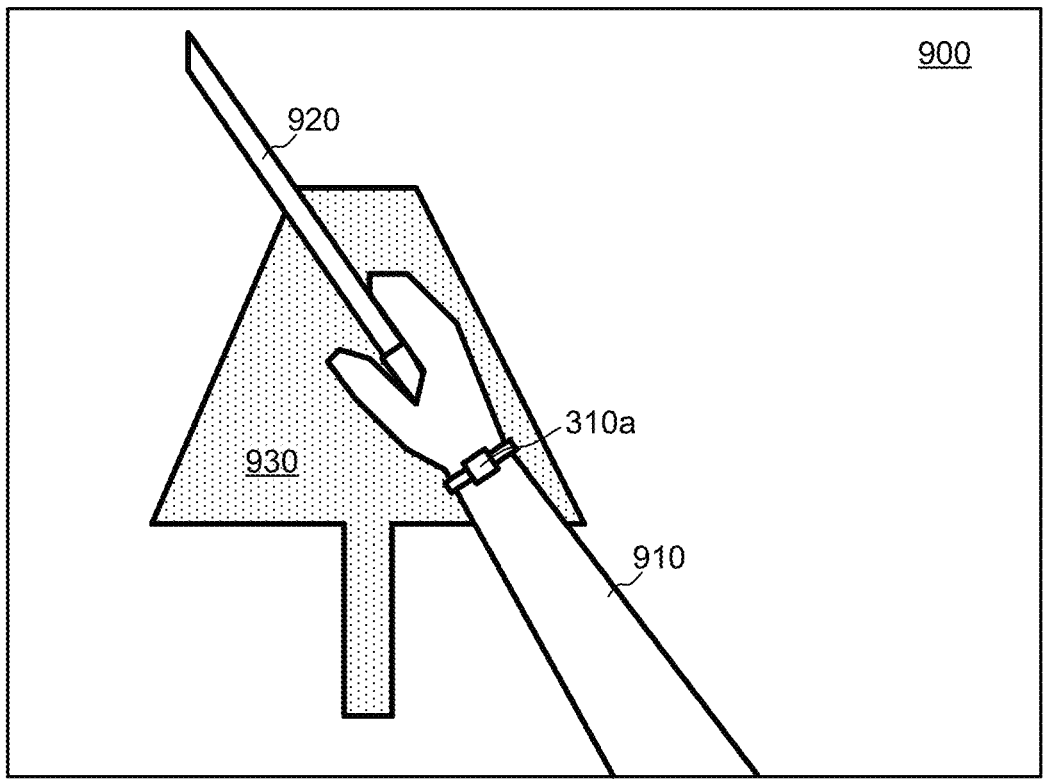
FIGS. 9A and 9B are a drawing and flowchart showing an example arrangement for rendering a hologram such that it appears behind a user's hand when viewed through a headset.
Figure 9B:
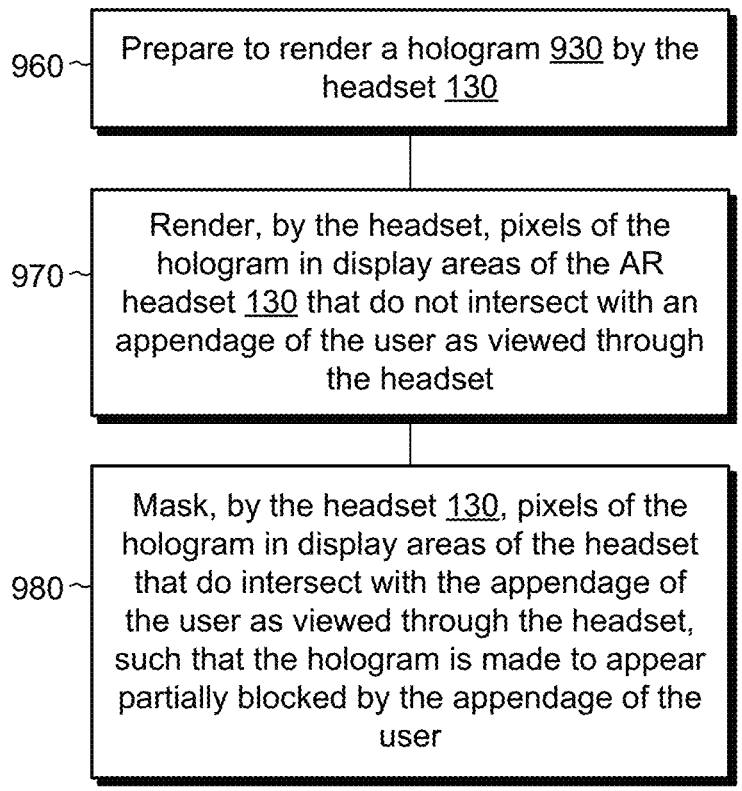
Figure 9B:
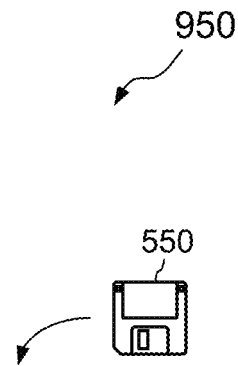

FIGS. 9A and 9B depict an example arrangement for displaying holograms through the headset 130 relative to body appendages of the user. FIG. 9A shows an example user view 900 through the headset 130. The user's arm 910 can be seen (with wrist sensor 310*a*), as well as a controller 920, which is shaped like a sword. The controller 920 may include buttons and other controls for enhancing game play. A hologram 930, which represents some virtual object in the background, is also visible in the user's view 900. Maintaining the hologram 930 in the background relative to the user's arm 910 and the controller 920 is a difficult problem for conventional MR systems but is readily managed here, as shown in FIG. 9B.

At 960 of FIG. 9B, the headset 130 prepares to render the hologram 930, i.e., on the display elements in the headset 130. Owing to the close proximity of the wrist sensor 310*a* to the user's hand, the headset 130 identifies the arm 910 within the field of view and proceeds to identify pixel locations corresponding to parts of the arm 910 as foreground. The headset 130 also identifies as foreground pixel locations of any object connected to the arm 910, such as the controller 920.

At 970, the headset 130 renders, in the display elements, pixels of the hologram 930 that do not overlap with the user's arm 910 or with the controller 920. Thus, any pixel locations of the hologram 930 not marked as foreground are rendered in the usual way.

At 980, however, where pixels of the hologram 930 do intersect with locations marked as foreground (where parts of the arm 910 or controller 920 can be found), the headset 130 masks those pixels of the hologram 930 and fails to render them. The overall effect is to mask out pixels of the hologram 930 that should be blocked by the user's arm and controller, so as to maintain the illusion that the hologram 930 is in the background. It should be noted that the particular pixels of the hologram 930 to be displayed or masked will be different for left and right display elements, owing to the differences in perspective. Thus, not only are the pixels of the hologram 930 rendered so as to preserve proper background and foreground, but also proper perspective and parallax, such that the user perceives both the arm 910 and the hologram 930 at proper distances.

Attention to this point has been focused on activities involving a single user 120. However, many applications, such as games, may involve multiple users. For example, multiple users may occupy the physical space 110 shown in FIG. 1, with each user's location tracked by the sensors 140 and server apparatus 150, i.e., in the same manner as described for the user 120. Each user may create a skeletal model 420, which may be rendered as an avatar 430 (FIG. 4). In some examples, each user in the physical space 110 sees all the other users as avatars, which may be superimposed over the user's physical bodies.

Figure 10:
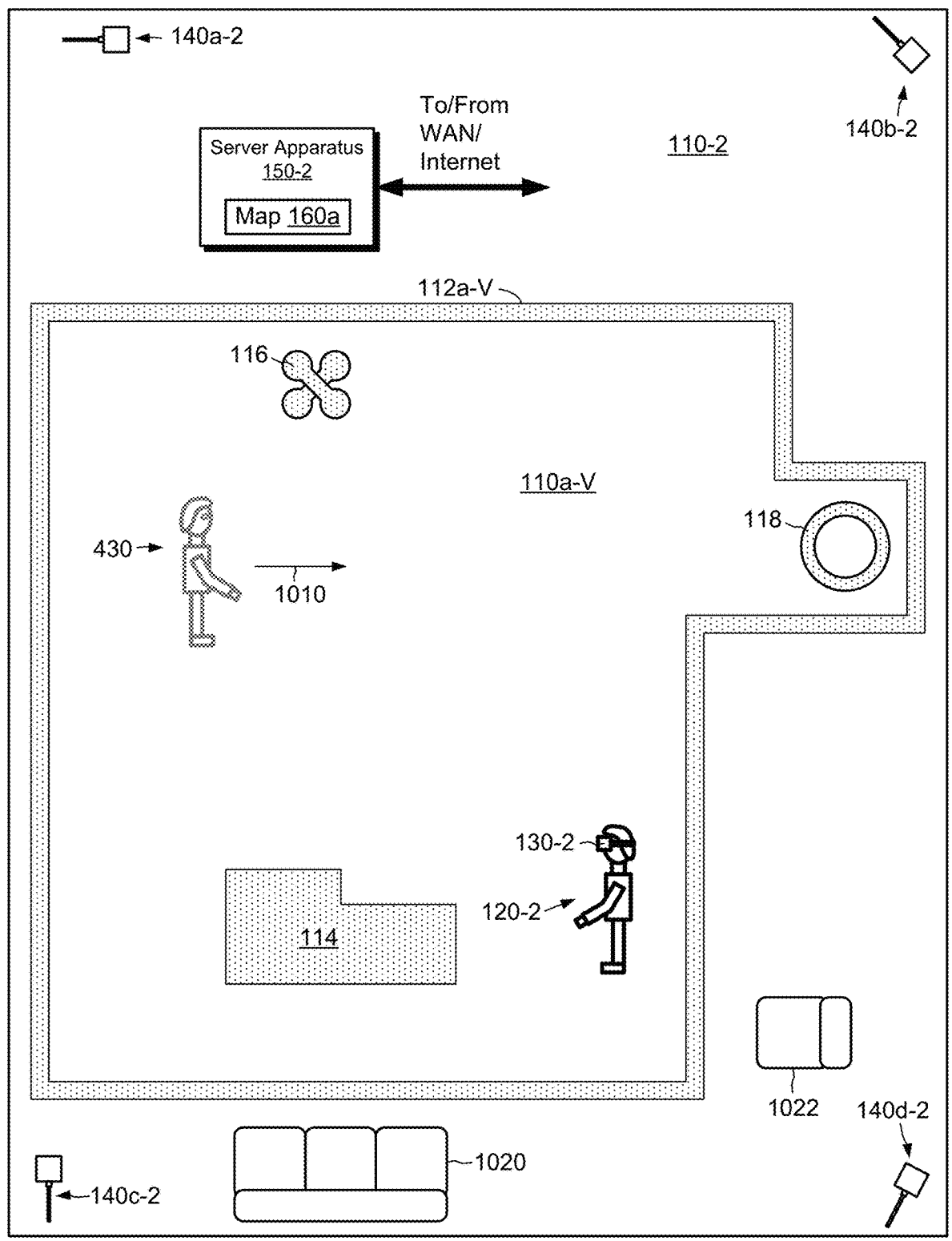
FIG. 10 is a top, plan view of a second physical space of a second user, where features of the physical space and user of FIG. 1 are rendered as virtual content.

FIG. 10 shows another multi-user scenario. Here, a second user 120-2 is located within a second physical space 110-2, which is discontinuous and remote from the physical space 110 shown in FIG. 1 (hereinafter, the "first" physical space). The second physical space 110-2 is configured similarly to the first, and includes its own sensors 140*a*-2 through 140*d*-2 and server apparatus 150-2. The second physical space 110-2 may have a different shape from the first physical space 110. The "play zone" is an area designated for game play or other activity. Furniture 1020 and 1022 in the second physical space 110-2 may be moved out of the way to clear space for the play zone.

In the example shown, the second server apparatus 150-2 has obtained shared map data 160*a* from the first server apparatus 150 (FIG. 1), e.g., over the WAN/Internet 250. The shared map data 160*a* includes portions of the map data 160. Sharing may be accomplished, for example, by the owner of the vault appliance 230 in the first physical space 110 granting a content right to the second user 120-2 to access particular features in the physical space 110. Here, map data describing features of the first room 110*a* are shared, such as walls 112*a*, whereas map data describing other portions of the physical space 110 are not shared, such as data describing the room 110*b* and walls 112*b* (e.g., the first user 120 may wish to keep the room 110*b* private). In general, map data 160 may be shared at any desired level of granularity. By obtaining the shared map data 160*a*, a second headset 130-2 worn by the second user 120-2 is able to render objects that are physical in the first physical space 120 as virtual objects in the second physical space 110-2. Thus, the second user 120-2 is able to visualize the room 110*a* and walls 112*a* as holograms 110*a*-V and 112*a*-V, respectively.

In some examples, the second server apparatus 150-2 also receives information about the holograms 114, 116, and 118, allowing the same holograms to be rendered to the second user 120-2 as were rendered to the first. The second user 120-2 thus sees, through the second headset 130-2, the same holograms in the same relative positions as they appear to the first user 120 in the first physical space 110.

In addition to receiving shared map data 160*a*, the second server apparatus 150-2 also receives, over the WAN/Internet 250, a real-time representation of the avatar 430 of the first user 120, including its location and orientation relative to the play zone. With this arrangement, the second user 120-2 is able to see the avatar 430 of the first user 120 move within the second physical space 110-2 (movement shown by arrow 1010) in a manner that mirrors the movement of the first user 120 within the first physical space 110. In a like manner, the first user 120, within the first physical space 110, sees an avatar of the second user 120-2 displayed and moving in real time in synchronization with the second user 120-2. This arrangement is extendible to any number of users, with each user's headset rendering the holograms 114, 116, and 118 and the avatars of the other users, with the avatars moving in real time to reflect movements of the users they represent. Also, each user's headset, with the possible exception of the first user's (where it may not be necessary), renders a virtual rendition of the shared portions of the physical space 110. Owing to the global perspective afforded by the stationary sensors and the computerized apparatus in each physical space, the position and orientation of each avatar relative to the play zone matches the position and orientation of the respective physical user in that user's local play zone.

In some examples, the shared map data 160*a* represents physical objects in the first physical location 110 in simplified form, with certain details of the physical space removed to avoid distraction and/or to maintain privacy. For example, a wall with a built-in bookshelf may be represented as a flat wall, or as a wall with a stylized surface texture or synthetic content. A desk covered with papers may be represented as a flat surface.

Synthetic content may be supplied by users, by games, and/or by third-party software, for example. Sharing of content may go in any direction. For example, the second user 120-2 may design a virtual object and place that object in a particular location within the play zone, sharing that object back to other users via respective server apparatus.

In some examples, a game or other software application may generate the play zone, which need not correspond to features in any physical space. For example, the game may define the play zone and share that play zone with all users. The server apparatus at each location may instantiate the play zone locally. Users can then view features of the play zone and avatars of other users through their respective headsets. Games or other software applications may also produce computer-generated avatars, which move through the play zone and can be viewed at corresponding locations by all users.

Figure 11A:
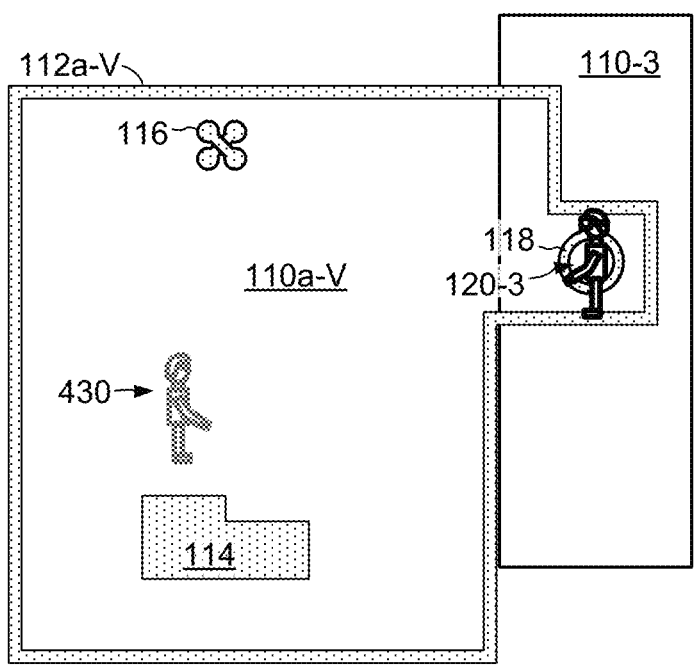
FIGS. 11A and 11B are top, plan views showing example operation of a virtual interconnect when used to reorient a virtual space around a user.
Figure 11B:
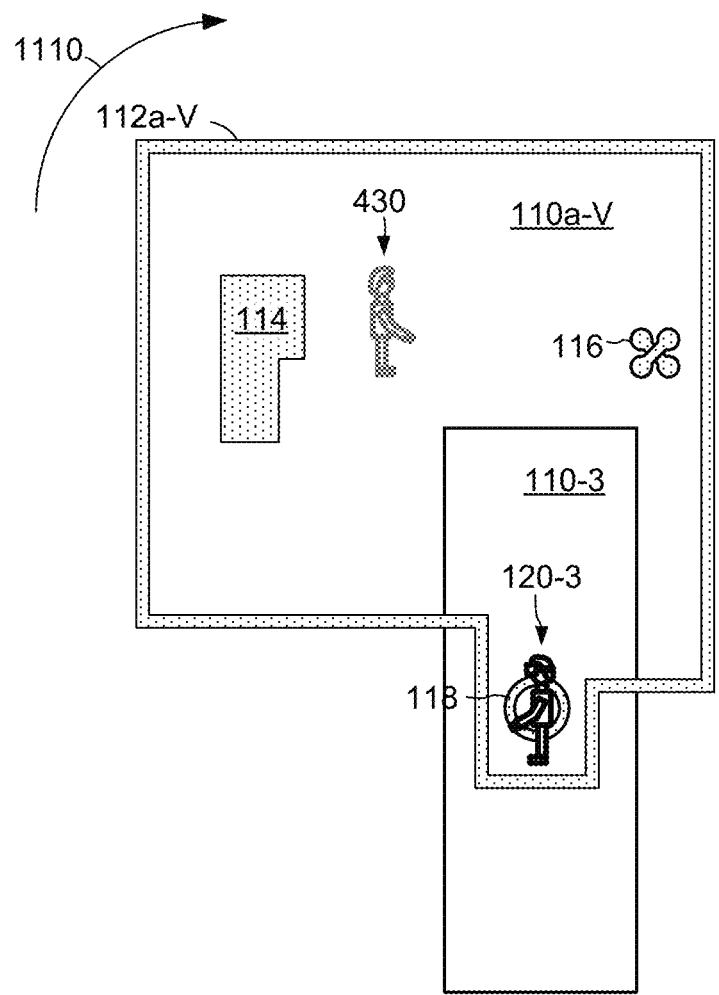

FIGS. 11A and 11B show an example embodiment involving a scene. As previously mentioned, a "scene" is a collection of holograms and virtual interconnects, where a "virtual interconnect" is a designated space that a user may enter to perform an action.

In the example of FIG. 11A, the virtual object 118 depicts a virtual interconnect rendered in a third physical space 110-3. Unlike the previous examples, the third physical space 110-3 is smaller than the play zone; it may merely be a hallway. A user 120-3 wears a headset 130-3, which renders the virtual interconnect 118 as a glowing circle on the floor, or in any other suitable manner. The third user 120-3 may enter the virtual interconnect 118 by stepping into the circle. Once inside the virtual interconnect 118, the headset 130-3 presents the user 120-3 with various options. There is no limit to these options, but examples may include teleportation (e.g., to a different play zone), entry into a VR realm, and rotation of the play zone. In this example, we assume that the user 120-3 selects the rotation option.

FIG. 11B shows an example result of rotation. Here, the system has rotated the entire play zone, including all virtual objects, ninety degrees about the virtual interconnect 118. The user 120-3 is then able to exit the virtual interconnect 118 and enter into a main part of the virtual room 110a-V. Multiple virtual interconnects may be provided at respective locations to accommodate users in confined physical locations.

Figure 12A:
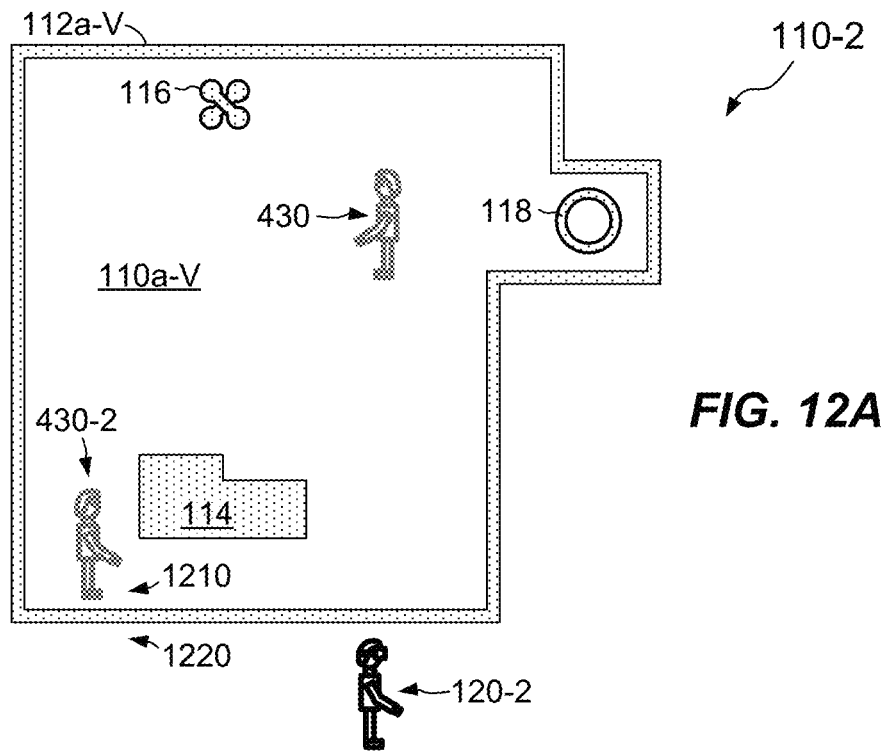
FIGS. 12A and 12B are top, plan views showing an example consequence of a user crossing a barrier hologram or leaving a play zone.
Figure 12B:
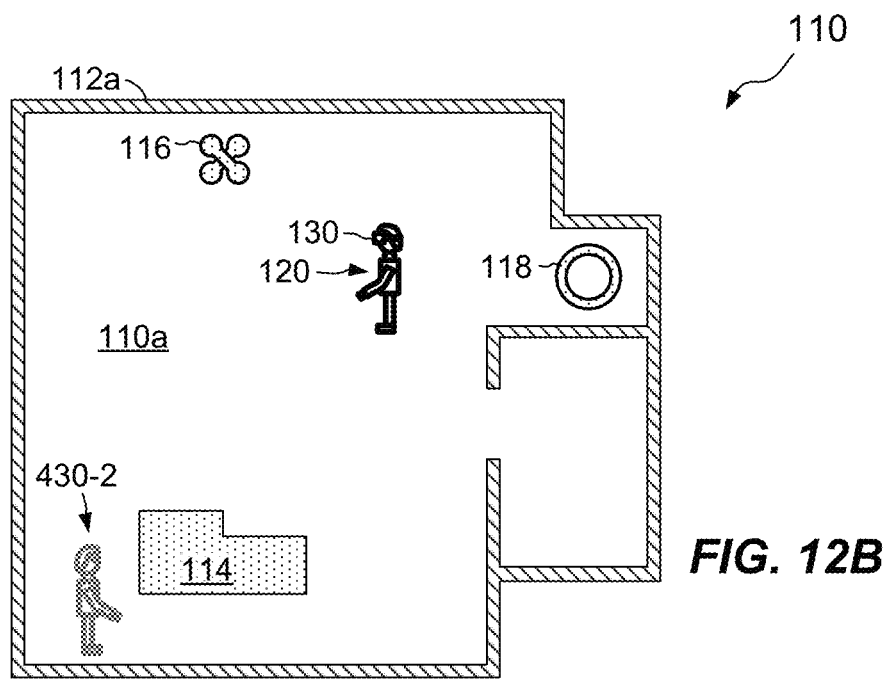

FIGS. 12A and 12B show an example arrangement for encouraging users to stay within the play zone and to avoid moving to locations that are off-limits. For example, the second physical space 110-2 (FIG. 10) is larger than the play zone, such that the second user 120-2 is able to physically leave the play zone. During normal game play, this freedom may present an unfair advantage for the second user 120-2. At minimum, it is inconsistent with the wish to keep all players in the game.

As shown in FIG. 12A, the second user 120-2 in the second physical space 110-2 has left the play zone. For example, the second user 120-2 has crossed from a first side 1210 of the virtual wall 112a-V to a second side 1220. Here, when the second user 120-2 leaves the play zone, the avatar 430-2 of the second user 120-2 stays behind, i.e., on the first side 1210 of the virtual wall 112a-V. The avatar 430-2 may remain in this position until the second user 120-2 returns to the same location, at which point the avatar 430-2 resumes tracking the movements of the second user 120-2.

FIG. 12B shows the same situation from the viewpoint of the first user 120 in the first physical space 110. The first user 120 sees, through the headset 130, the avatar 430-2 of the second user 120-2, but the avatar 430-2 appears to be standing still—until the second user returns such that tracking can resume.

Similar behavior may apply when a user crosses any hologram that represents a barrier. For example, holograms may be used to represent barriers that users must stay within to participate in a game. Anytime a user crosses a barrier, such as a virtual wall, or otherwise steps out of bounds, the system may freeze that user's avatar, forcing the user to return to the place where the barrier was crossed. This behavior has the effect of enforcing virtual barriers to prevent cheating, e.g., by allowing users to take short cuts.

Figure 13:
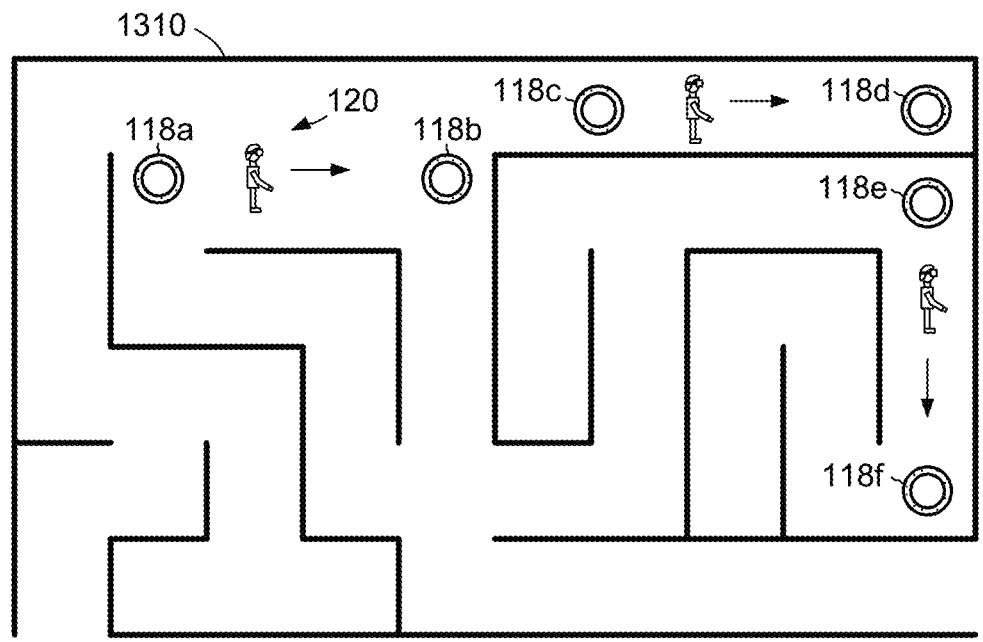
FIG. 13 is a top, plan view of an example play zone showing various uses of virtual interconnects.

FIG. 13 shows an example of a different play zone, which is laid out as a simple maze 1310. Here, the walls of the maze are set up as barriers, such that users must stay within the designated paths of the maze to avoid becoming separated from their avatars. FIG. 13 also shows various uses of virtual interconnects. For example, the system provides virtual interconnects 118a and 118b at maze decision points. A user 120 entering these virtual interconnects 118a and 118b may rotate the perspective, as described in connection with FIGS. 11A and 11B. The user may also specify a rate of movement. For example, the user may specify accelerated movement, such that each meter the user walks in physical space is translated to N meters of movement in virtual space—through the maze 1310.

In an example, virtual interconnects 118c and 118d specify a 1:1 scale movement, such that every meter the user walks in physical space is mapped 1:1 to a meter in virtual space. Virtual interconnects 118e and 118f may require the user 120 to enter a VR realm to cross the indicated distance. The VR realm may present particular challenges that the user must overcome to cross the indicated distance.

Figure 14:
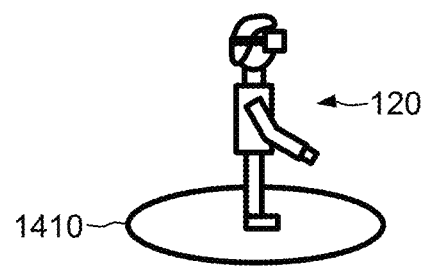
FIG. 14 is a perspective view of a user entering a VR realm in a predefined location.

FIG. 14 shows an example spot 1410 that users may step into to enter a VR realm. A game or other software application may place such "VR Anywhere" spots 1410 at desired locations within a play zone. Once inside a VR Anywhere spot 1410, the user 120 is able perform VR commands to navigate a synthetic VR space, e.g., using the above-described physical movements mapped to control commands. The VR space is not required to have any relationship to the physical space in which the user is located. The VR Anywhere spot 1410 is preferably a small area, e.g., just large enough to safely accommodate the user 120 executing the predefined movements. In some examples, VR control commands are enabled only when the user 120 remains within the VR Anywhere spot 1410 and are disabled if the user steps out of the VR Anywhere spot 1410. In some examples, the system checks local map data 160 and locations of other users to ensure that no mapped objects are within some predetermined radius of the VR Anywhere spot 1410, to protect the user 120 (and other users) from harm that may result from sudden movements of the user's head, arms, legs, or torso.

Users may also use portals view VR realms from AR environments. A "portal" is an AR viewable object that provides a VR view of an arbitrary space. The viewed space could be virtual, another LPS Zone or the same LPS Zone. Portals come in pairs: a viewing portal and a capture portal. Observers look into the viewing portal and see what is on the other side of the capture portal. When the word portal is used by itself, it typically refers to the viewing portal.

A "viewing portal" is defined by:
Shape: A surface, typically a planar surface but can be any shape.
Location: The location is not restricted within the playable area of the LPS Zone.
Normally, for safety reasons, portals will be close to walls, ceilings or other player inaccessible areas.
Orientation: The orientation of a portal is also not restricted but typically would be oriented in a way to permit ease of use of the players. The orientation is relative to the LPS Zone
A capture portal is defined by:
Shape: Identical to the paired viewing portal.
Location: The location is not restricted. It may in the same or different LPS Zone or in a fully virtual environment.
Orientation: The orientation is independent of the orientation of the viewing portal.

Portals are unidirectional. To get the effect of a bidirectional portal, one simply needs to use two.

The relative position of the viewer defines the content seen through the portal. The capture portal need not be the equivalent of a fixed camera providing the view for the viewing portal. If the view is provided via AR projection or produced on a physical screen, it must typically be this way. If the portal is viewed via AR glasses, then the viewable content can be different for each viewer. In this case, the view seen through the viewing portal is made using standard ray tracing techniques based on the location of the observer. The only difference is that the rays that hit the observer side of the viewing portal leave the capture side of the capture portal at the same relative angle.

Virtual objects may cross the portal between the two connected LPS Zones. Here, an observer would see a consistent view of the virtual object as it approached the capture side of the capture portal, transitioned through the viewing portal and as it became a full blown AR object in the local LPS Zone of the observer.

According to certain embodiments, a physical space or environment is a gaming dimension with infinite variability as follows:
  A player can put a virtual object in AR space that is aware of its surroundings (e.g. a virtual object of a cat can climb the physical stairs).
  A game can connect to VR spaces (including other PlayZones) using portals, VR Anywhere spots, projected spaces or virtual common rooms.
  Connections to VR spaces can be persistent or temporal (i.e., they can pop up and go away in any place throughout the PlayZone according to the game design). This is a completely new way for the game designer to use physical space as a dimension in the game.
  Players can move their avatars through virtual space.
  Virtual objects can move between the MR environment and virtual spaces (e.g., a virtual ball tossed through a portal).
  Physical spaces can be broken up using the scenes Virtual reality (VR) and Augmented reality (AR) environments could be integrated into the same application. AR objects could be viewed from multiple angles and could move among discontiguous physical environments (whether those are multiple rooms in the same building or rooms in separate buildings separated by an arbitrary distance).

Coextensive Reality consists of multiple players in PlayZones that are networked together (virtually interconnected). The game server is the master. It keeps the state of each PlayZone. Each player sends his state information to the game server (to track the physical state of each player). When a player enters a different virtual area, the game engine is the master of what is seen. If it is a physical area, the player sees AR objects projected. If it is a virtual area, the player sees virtual objects.

General rules about games, PlayZones, avatars and players in CR games are as follows:
  The CR Game Hub supports one active game at a time. As such each game has a guaranteed set of resources dedicated to it.
  Every player has exactly one avatar.
  There is exactly one active PlayZone per house.
  The CR Game Hub may define an arbitrary number of PlayZones.
  Every PlayZone has a corresponding virtual model (VR PlayZone) that can be visited by avatars.
  Virtual Realms that do not correspond to physical PlayZones can also be defined in the game and visited by avatars.

Within their own PlayZone, players see avatars as virtual objects overlaid in the physical world just as they see other virtual objects.

In VR View, the player sees an avatar as a virtual thing in the virtual world. VR View occurs with any of the four virtual interconnect methods that enable connection to VR PlayZones (or Virtual Realms):
  Portal: A camera view into VR. Essentially a "window" that appears as an AR object that shows a view into a virtual space.
  Projected Space: Designated physical space where a player's body motion is mirrored by his avatar in a space of the same size in another PlayZone.
  Virtual Common Room: Projected Space that allows participation by players in all corresponding spaces. There can be two or more corresponding PlayZones/spaces.
  VR Anywhere Spot: Spot where player stands to virtually teleport to another PlayZone (or Virtual Realm), uses motion-control to move his own avatar, and interacts with real players.

Note that these basic methods can be combined to enable more complex behavior. For instance, a physical player could see another physical player in the same PlayZone in several ways:
  Case 1: They are able to interact physically and seeing the other player permits interaction with the other player.
  Case 2: They are not permitted direct physical-to-physical interaction. In this case the player may be able to be physically seen but the game rules state that the player must be found by using one of the four virtualization methods.
  Case 3: One physical player is hiding using a non-PlayZone "blanket," so the observer can see the hiding player's avatar (as an AR projected object). The player then interacts with this avatar.
  Case 4: If 2 physical players are in the same PlayZone and one player locks the door, the "attacking" player can himself enter a VR Anywhere spot and explore his own PlayZone as an avatar to find and "get" the other player.

Game environments and control methods for Coextensive Reality (CR) games are fundamentally different than other game types:
  Environments: The environments in which the games are held use the actual geometry of the users' homes, as well as virtual environments. Legacy games are complete virtual environments. Because the actual user's home is used within a multiplayer multi-location game, a method of modeling the user's PlayZone area is needed. This model is then shared with the game engine as well as other game clients. One user's physical play area is another user's virtual play area.
  Control: CR control is unique in that it naturally supports control in both AR and VR modes. Single point observation systems (i.e. room scale VR) use a combination of body motion control and handheld controls for avatar movement control. The handheld controllers are also used for player/object interaction as well. Legacy console games typically use multifunction controllers that control both avatar movement as well as interactions with other players and game content. In CR control, handheld controllers for player and object interaction should operate identically whether in AR or VR. Furthermore, because the controller is used in AR mode, the controller should physically appear like the object being controlled. A gun should look like a gun. Unique to CR games is the seamless transfer between AR and VR control. In AR control it is impossible to move the avatar separate from the player movement; hence, sensors are used to detect body movement. Coupling the above statements together it only makes sense to separate movement control and player/object interaction control. The wearables are responsible for movement control and the handheld controller is responsible for player/object interaction. Individual games may break this rule with custom controllers.

Figure 15:
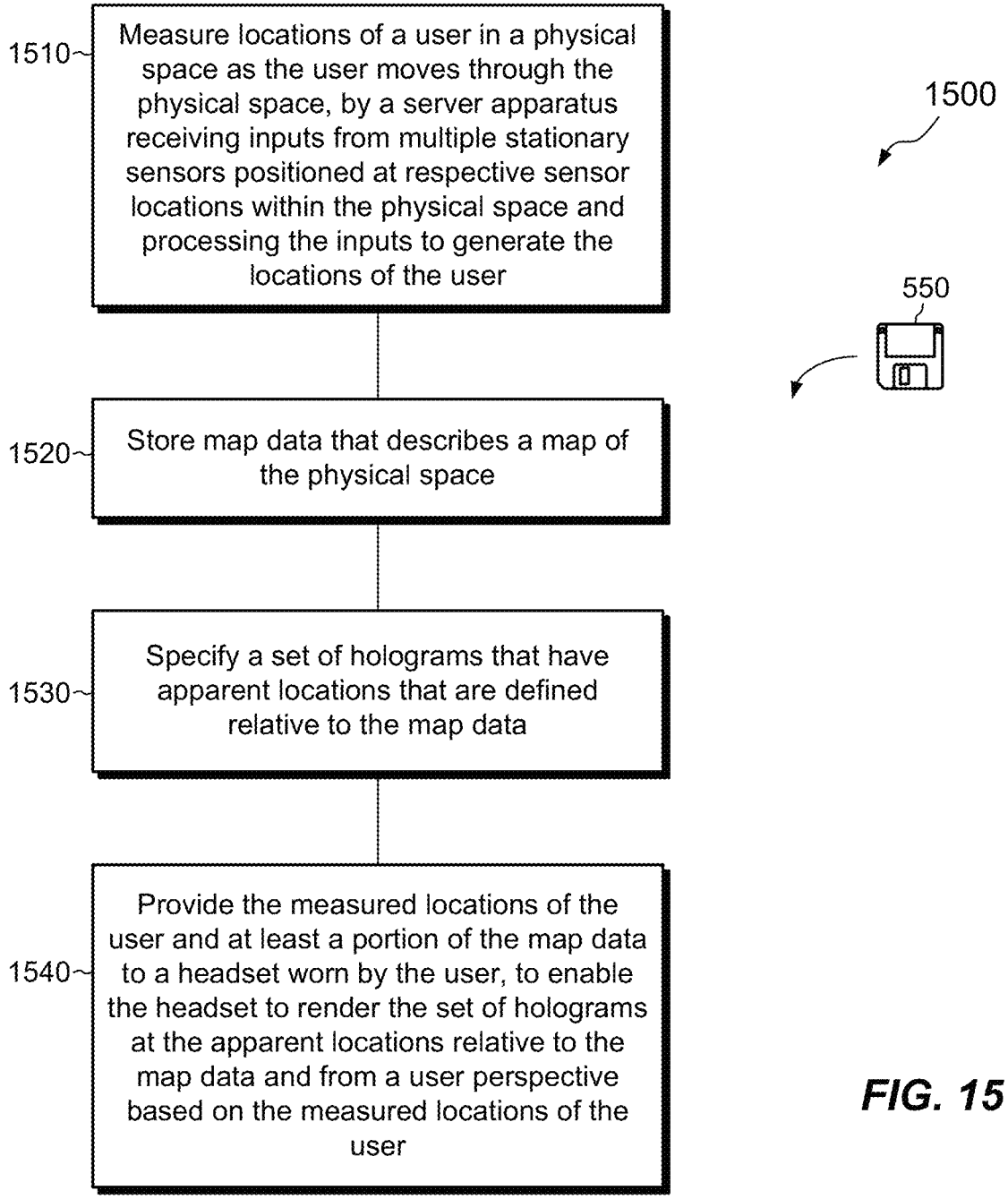
FIG. 15 is a flowchart showing an example method of managing virtual content to be displayed to users via headsets.

FIG. 15 shows an example method 1500 of managing virtual content to be displayed to users via three-dimensional imaging headsets, such as AR and MR headsets. The method 1500 may be carried out, for example, by the server apparatus 150 described in connection with FIG. 2. The various acts of method 1500 may be ordered in any suitable way. Accordingly, embodiments may be constructed in which acts are performed in orders different from that illustrated, which may include performing some acts simultaneously.

At 1510, the server apparatus 150 measures locations of a user 120 in a physical space 110 as the user 120 moves through the physical space 110, by receiving inputs from multiple stationary sensors 140 positioned at respective sensor locations within the physical space 110 and processing the inputs to generate the locations of the user 120.

At 1520, map data 160 are stored. The map data 160 describes a map of the physical space 110.

At 1530, a set of holograms (e.g., 114, 116, 118) are specified. The set of holograms have apparent locations that are defined relative to the map data 160.

At 1540, the measured locations of the user 120 and at least a portion of the map data 160 are provided to a headset 130 worn by the user 120, to enable the headset 130 to render the set of holograms (e.g., 114, 116, 118) at the apparent locations relative to the map data 160 and from a user perspective based on the measured locations of the user.

Having described certain embodiments, numerous alternative embodiments or variations can be made. For example, although certain activities have been ascribed herein to the headset 130, LPS base station 210, vault appliance 220, and application server 230, one should appreciate that processing tasks may be distributed among these components in any suitable way. Thus, certain tasks described as being performed by the headset 130 may alternatively be performed by the other components, and vice-versa. Also, some activities ascribed to the server apparatus 150 may instead be performed by public servers 260 accessible over the WAN/Internet 250.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as one or more computer program products each including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIGS. 5, 7, 8, 9B, and 15). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing virtual content displayed via three-dimensional imaging headsets, the method comprising:
   operating a headset worn by a user in a physical environment;
   assuming by the headset one of (i) an AR (Augmented Reality) mode or (ii) a VR (Virtual Reality) mode, the AR mode effecting locomotion of an avatar of the user in response to locomotion of the user in the physical environment, the VR mode effecting locomotion of the avatar in response to the user operating controls;
   in response to an action by the user, switching the headset to the other of the AR mode or the VR mode;
   rendering, by the headset, a hologram that defines a region in space as an area of floor space within the physical environment, wherein switching the headset to the other of the AR mode or the VR mode is based at least in part on the user entering the region in space defined by the hologram;
   enabling VR control commands for performing VA activities in response to the user being located within the defined area of floor space; and
   disabling the VA control commands in response to the user not being located within the defined area of floor space.

2. The method of claim 1, further comprising, while operating in the VR mode, mapping poses of the user to control commands for controlling the avatar of the user in a VR environment.

3. The method of claim 1, further comprising mapping movements and/or poses of the user to control commands, the control commands controlling the avatar of the user.

4. The method of claim 3, further comprising, while operating in the VR mode with the user at a stationary location relative to the physical environment, translating movements and/or poses of the user at the stationary location to locomotion of the avatar.

5. The method of claim 1, wherein the action by the user includes assuming a particular pose by the user.

6. The method of claim 1, wherein operating the headset includes participating in a multi-user system that enables headsets to operate in both the AR mode and the VR mode, and wherein the method further comprises, while the headset of the user is operating in the VR mode, displaying by the headset (i) virtual content of a VR environment and (ii) an avatar of another user of the multi-user system while a headset of the other user is operating in the AR mode.

7. The method of claim 1, wherein operating the headset includes participating in a multi-user system that enables headsets to operate in both the AR mode and the VR mode, and wherein the method further comprises, while the headset of the user is operating in the AR mode, displaying by the headset an avatar of another user of the multi-user system while a headset of the other user is operating in the VR mode.

8. The method of claim 1, wherein operating the headset includes participating in a multi-user system that enables headsets to operate in both the AR mode and the VR mode, wherein the avatar is generated as a representation of a body of the user, and wherein the method further comprises:
displaying the avatar of the user by a second headset of a second user of the multi-user system;
while operating the headset of the user in the AR mode, translating physical movements of the body of the user to corresponding virtual movements of the avatar as displayed by the second headset; and
while operating the headset of the user in the VR mode, translating physical movements of the user at a stationary location relative to the physical environment to virtual locomotion of the avatar as displayed by the second headset.

9. The method of claim 1, wherein switching the headset to the other of the AR mode or the VR mode is further based at least in part on the headset receiving a user command while the headset is disposed within the region in space defined by the hologram.

10. The method of claim 1, wherein the VR control commands include a first command to virtually teleport the user to a specified VR environment, and wherein the method further comprises executing the first command by changing a scene rendered by the headset to a scene of the specified VR environment.

11. The method of claim 10, wherein the specified VR environment is generated by a multi-user application having a set of other users, and wherein executing the first command includes rendering an avatar of the user to the other users in the VR environment, such that the other users are able to see the avatar of the user within the VR environment.

12. The method of claim 11, wherein executing the first command further includes rendering avatars of the other users in the VR environment to the user, such that the user is able to see the avatars of the other users within the VR environment.

13. The method of claim 1, wherein the VR control commands include a second command to virtually rotate, and wherein the method further comprises executing the second command by rotating a scene of a VR environment rendered by the headset such that the user faces in a different direction relative to the scene of the VR environment.

14. The method of claim 1, wherein the VR control commands include a third command to virtually teleport the user from a first location in a VR environment to a second location in the VR environment, and wherein the method further comprises executing the third command by changing a scene rendered by the headset to that of the specified VR environment at the second location.

15. The method of claim 1, wherein the VR control commands include a fourth command to virtually teleport the user from a first VR environment to a second VR environment, and wherein the method further comprises executing the fourth command by changing a scene rendered by the headset to a scene of the second VR environment.

16. The method of claim 1, wherein the VR control commands include a fifth command to switch from the VR mode to the AR mode, and wherein the method further comprises executing the fifth command by translating locomotion of the user to locomotion of the avatar of the user.

17. The method of claim 16, wherein the fifth command is executed in response to the user exiting the area of floor space defined by the hologram.

18. The method of claim 1, wherein rendering the hologram that defines the region in space includes checking local map data to ensure that no other users or obstacles are within a predetermined safe distance of the hologram.

19. The method of claim 1, further comprising, while operating in the AR mode, displaying by the headset a virtual portal, the virtual portal providing a virtual window into a VR environment, the headset thereby simultaneously displaying both (i) virtual content in the physical environment outside the virtual portal and (ii) virtual content of the VR environment inside the virtual portal.

20. The method of claim 1, further comprising, while operating in a first VR environment in the VR mode, displaying by the headset a virtual portal, the virtual portal providing a virtual window into a second VR environment, the headset thereby simultaneously displaying both virtual content of the first VR environment outside the virtual portal and virtual content of the second VR environment inside the virtual portal.

21. The method of claim 1 wherein, when operating in the VR mode, the headset does not map locomotion of the user to locomotion of the avatar of the user.

22. The method of claim 1, wherein rendering, by the headset, the hologram that defines the region in space includes rendering the hologram in a location determined, based on checking local map data, to protect the user and/or others from injury.

23. A headset to perform three-dimensional imaging, the headset comprising control circuitry that includes a set of processors coupled to memory, the control circuitry constructed and arranged to:
operate the headset in a physical environment;
assume by the headset one of (i) an AR (Augmented Reality) mode or (ii) a VR (Virtual Reality) mode, the AR mode effecting locomotion of an avatar of a user of the headset in response to locomotion of the user in the physical environment, the VR mode effecting locomotion of the avatar in response to the user operating controls;
while the headset is configured to operate in the AR mode, render, by the headset, a hologram that defines a region of floor space in the physical environment;
in response to the user entering into the defined region of floor space, switch the headset to the VR mode and enable VR control commands for performing VR activities; and in response to the user exiting from the defined region of floor space, switch the headset to the AR mode and disable VR control commands for performing VR activities.

24. A method of managing virtual content displayed via three-dimensional imaging headsets, the method comprising:
- operating a headset worn by a user in a physical environment;
- assuming by the headset one of (i) an AR (Augmented Reality) mode or (ii) a VR (Virtual Reality) mode, the AR mode effecting locomotion of an avatar of the user in response to locomotion of the user in the physical environment, the VR mode effecting locomotion of the avatar in response to the user operating controls; and
- while the headset is operating in the AR mode, rendering, by the headset, a hologram that defines a region of floor space in the physical environment;
- in response to the user entering into the defined region of floor space, switching the headset to the VR mode and enabling VR control commands for performing VR activities; and
- in response to the user exiting from the defined region of floor space, switching the headset to the AR mode and disabling VR control commands for performing VR activities.

25. The method of claim 24, further comprising, while operating in a first VR environment in the VR mode, displaying by the headset a virtual portal, the virtual portal providing a virtual window into a second VR environment, the headset thereby simultaneously displaying both virtual content of the first VR environment outside the virtual portal and virtual content of the second VR environment inside the virtual portal.

* * * * *